United States Patent
Torres

(10) Patent No.: US 12,482,304 B2
(45) Date of Patent: Nov. 25, 2025

(54) SYSTEM AND A METHOD FOR AUTHENTICATING INFORMATION DURING A POLICE INQUIRY

(71) Applicant: Jose Torres, Vernon, CT (US)

(72) Inventor: Jose Torres, Vernon, CT (US)

(*) Notice: Subject to any disclaimer, the term of this patent is extended or adjusted under 35 U.S.C. 154(b) by 604 days.

(21) Appl. No.: 17/936,390

(22) Filed: Sep. 29, 2022

(65) Prior Publication Data

US 2023/0116941 A1 Apr. 20, 2023

Related U.S. Application Data

(60) Provisional application No. 63/261,577, filed on Sep. 24, 2021.

(51) Int. Cl.
| | | |
|---|---|---|
| G07C 5/00 | (2006.01) | |
| G06F 16/2457 | (2019.01) | |
| G06F 16/25 | (2019.01) | |

(52) U.S. Cl.
CPC ......... *G07C 5/008* (2013.01); *G06F 16/2457* (2019.01); *G06F 16/258* (2019.01)

(58) Field of Classification Search
CPC .......... G08B 5/36; G08B 5/38; B60W 50/14; B60W 50/10; B60W 2050/146; H04W 4/46; H04W 4/029; H04W 4/021; H04W 4/024; H04W 4/02; H04W 4/44
See application file for complete search history.

(56) References Cited

U.S. PATENT DOCUMENTS

| | | |
|---|---|---|
| D437,815 S | 2/2001 | Lyon |
| 6,868,313 B2 | 3/2005 | Koljonen |

(Continued)

FOREIGN PATENT DOCUMENTS

| | | | | |
|---|---|---|---|---|
| KR | 20140108889 A | * | 9/2014 | ....... G06K 19/06037 |
| WO | 2019028262 A1 | | 2/2019 | |

OTHER PUBLICATIONS

Two toy vehicles interaction using communication protocol for visible light communication (Year: 2016).*

(Continued)

*Primary Examiner* — Sangeeta Bahl
(74) *Attorney, Agent, or Firm* — Willie Jacques; Emanus, LLC

(57) ABSTRACT

A system and a method for authenticating information of a vehicle and automobilist. The system comprising a first handheld device associate with a first user, configured to generate a request for authenticating the information of a vehicle or a residential property. The system also comprises a second handheld device associated with a second user, configured to acknowledge the request. The system also comprises an informatory device configured to communicate with the first handheld device and second handheld device. The informatory device comprises a magnetic body coupled at a first side of the informatory device and a plastic body coupled to the magnetic body, at a second side of the informatory device. The vehicular informatory device also comprises a circuitry which facilitates communication among the first handheld device, the second handheld device, and the informatory device for authenticating the information of the vehicle or the automobilist of the vehicle.

20 Claims, 17 Drawing Sheets

(56) References Cited

U.S. PATENT DOCUMENTS

| | | | |
|---|---|---|---|
| 6,876,296 B2* | 4/2005 | Talmadge | G06K 19/07749 342/51 |
| 7,352,290 B2* | 4/2008 | Eskridge | G08G 1/127 340/928 |
| 7,522,881 B2* | 4/2009 | Yamagiwa | G07C 5/085 455/411 |
| 10,269,242 B2* | 4/2019 | Ahmad | G08G 1/205 |
| 10,574,940 B2* | 2/2020 | Duale | H04N 7/155 |
| 10,614,273 B2* | 4/2020 | Lee | G06K 17/0022 |
| 10,723,261 B2* | 7/2020 | Beebe | G06V 20/584 |
| 10,817,766 B2* | 10/2020 | Batra | G06K 19/07758 |
| 2002/0044069 A1 | 4/2002 | Jenkinson | |
| 2003/0200227 A1* | 10/2003 | Ressler | G08G 1/017 |
| 2004/0094621 A1 | 5/2004 | LaMont | |
| 2006/0103568 A1* | 5/2006 | Powell | G08G 1/017 342/44 |
| 2009/0212929 A1* | 8/2009 | Drory | B60R 25/10 340/426.1 |
| 2011/0078933 A1 | 4/2011 | Lukawitz et al. | |
| 2013/0138267 A1* | 5/2013 | Hignite | G06F 17/00 701/2 |
| 2018/0338231 A1* | 11/2018 | Johnson | G06V 40/172 |
| 2019/0272743 A1* | 9/2019 | Henry | G08G 5/55 |
| 2020/0254926 A1 | 8/2020 | Golduber | |
| 2021/0394764 A1* | 12/2021 | Clines | G06F 16/93 |
| 2022/0270389 A1* | 8/2022 | Thompson | G06V 20/56 |
| 2023/0094217 A1* | 3/2023 | Gallagher | H04W 4/46 701/1 |

OTHER PUBLICATIONS

Automated vehicle identification AVI system based on RFID (Year: 2010).*

Goodson Tools and Supplies, Magnetic Head Bolt Washer & Valve Spring Shim Removal Tools, https://goodson.com/products/bolt-shim-removers .

* cited by examiner

SYSTEM AND A METHOD FOR AUTHENTICATING INFORMATION DURING A POLICE INQUIRY

CROSS REFERENCE TO RELATED APPLICATION

This application claims the priority benefit from the provisional application having application No. 63/261,577 filed on Sep. 24, 2021.

FIELD OF THE DISCLOSURE

The invention relates to a system and a method for authenticating information related to authorized occupants of a vehicle or a property. More particularly, the invention relates to a system and a method to provide a hassle-free way of presenting and authenticating information about occupants, including a resident of the property, or a driver of the vehicle during a police inquiry.

BACKGROUND OF THE DISCLOSURE

The subject matter discussed in this background section should not be assumed to be prior art merely as a result of its mention herein. Similarly, any problems mentioned in this background section or associated with the subject matter of this background section should not be assumed to have been previously recognized in the prior art. The subject matter as disclosed in this background section merely represents different approaches related to systems and methods for occupant [vehicular] information, wherein such systems and methods themselves may also correspond to implementations of the claimed technology and invention.

In the US, the Federal Highway Administration reports 32 million traffic stops per year. A large majority of the contacts police initiate with the public were related to traffic stops (Bureau of Justice Statistics, 2015). Every year police and civilians are killed during routine or suspicious traffic stops. Traffic stops are the epicenter of police and citizen interactions. Such encounters are an officer's most dangerous task of the job. When a traffic stop is conducted, a police officer checks the license plate and registration of the vehicle before leaving their cruiser and making contact with the motorist. This is a high-risk situation as the Officer has only a small amount of knowledge about the operator of the vehicle they have stopped. Officers can confirm the vehicle's owner, registration, demographics, and if the owner of the vehicle is wanted by law enforcement.

The traditional information conveyed to law enforcement through various computing systems only provides a snapshot of the person they may or may not be interacting with. Think about a common situation that occurs every day. Your teenage child has received their license. You allow your child to use your vehicle. Your child is stopped by police for running a red light. The Officer can pull up the registered owner of the vehicle but would not necessarily know who was truly operating the vehicle until making contact or otherwise engaging with the driver. Police could encounter another similar situation during their traffic stops. For instance, a friend has borrowed your vehicle. Your friend is stopped by the Police and has a warrant out for his/her arrest. Police just conducting traditional DMV checks would not have access to the actual driver at the time of the stop and therefore would be unable to search your friend in their database until after making direct contact with him/her. Both situations could lead to a potential high-risk situation.

Police officers undergo rigorous and semiannual recertification's which help them develop and practice "muscle memory". Police are trained in hands-on combat, firearms, and other safety technology devices. Muscle memory refers to the repetitive training of movements/handling safety gear an officer develops over time without conscious thoughts. This enables the officer's ability to defend or react in a situation as trained. In an unexpected hostile event, this survival technique is what they will rely on to overcome any life-threatening situation. As learned from trainings, their senses may be consistently heightened as if he/she was in a confrontational situation. Often, the training of an Officer is viewed by the public as aggressive. Some may even suggest Officers are always looking to engage in conflict even when it is a simple traffic stop.

High profile incidents with police have become a true concern that the public cannot further ignore. It seems the simplest encounters, such as traffic stops, between civilians and law enforcement, have gotten out of control, many times escalating into violence. These encounters are throwing folks into turmoil that only fosters doubt in public policies and human rights. As a result of some of these encounters have been fatalities. In other encounters, the officer's aggressive or demeaning actions have led to physical alterations that could have been avoided. Such circumstances are divisive and endanger social norms which nurtures mistrust and bitterness between the public and law enforcement. Community policing as we know it may soon change and policies on excessive use of force are being revamped.

In a preferred embodiment, what is disclosed is a system and method for authenticating information related, not only to the registered owner of a vehicle, but will also provide valuable information about the actual operator and/or occupants of the vehicle at the time of the stop (the PEACE application). In another embodiment, what is disclosed is an electronic device including an indicium of a peace symbol to provide a visual queue that the vehicle is enabled with the system and method for authenticating information about the registered owner of a vehicle, the actual operator and/or occupants of the vehicle (the PEACE device). In an aspect, the electronic device is affixed to the rear of the vehicle.

In another embodiment, the device is communicatively connected via an electronic signal to work cooperatively with a mobile phone application resident on any/all mobile devices of occupants in the vehicle. In yet another embodiment, the mobile device(s) is/are communicatively connected via an electronic signal to work cooperatively with real-time information about a driver and/or other occupants of a vehicle which is dynamically stored in a cloud-based computing system and network.

In an embodiment, it is envisioned that the system and method would provide a hassle-free/non-human contact way of presenting and authenticating information dynamically stored in a cloud-based computing system about a driver and/or other occupants of a vehicle during an inquiry conducted by police. During a traffic stop police can automatically receive/request information about the motorist and/or other occupants of the vehicle before leaving their vehicle. In an aspect, the operator and/or authorized owner of the vehicle would grant access through the PEACE application on their mobile device. In a further aspect, the PEACE device would include LED lighting that would be solid and/or blink in a predetermined mode when a police officer requests access. For example, the LED light(s) would be in a solid/non-blinking mode once the operator grants access alerting the police officer of the operator's compliance with the stop. It is envisioned that such a safety platform would help to facilitate the interaction between police and civilians to reduce the stress and anxiety of both police officer(s) and the driver/occupants of the stopped vehicle.

It is further envisioned that the system and method would reduce police/civilian altercations, miscommunication and confusion that might otherwise escalate into aggressive or violent interaction engendering social justice action. A goal of the system and method is to improve relationships between the public and law enforcement by creating an awareness of compliance by all parties concerned with the law and it is important because of the increasing conflicts cases between the law enforcement personnel and the public. Moreover, seeing the difficulty for the law enforcement personnel in inspecting each and every house in an area the system is needed. In an embodiment if the law enforcement personnel receive an order to inspect an area where a wanted person is hiding than it is difficult and dangerous for the law enforcement personnel to enter in all the houses and shops for the verification of the residents. In this situation the PEACE device may use to authenticate information of all the residents in the houses. Similarly, in another case if the vehicle of a person is stolen than it is difficult for the law enforcement personnel to find the stolen vehicle as they use to check documents of the vehicles on every check-post which decreases the traffic speed and it is difficult to check all the documents and other information of each vehicle passing through the check-post.

Moreover, drivers who may forget to carry the documents have to suffer from heavy fines if caught by law enforcement personnel during the inquiry on the check-post because one major and common traffic rule is that a driver of a vehicle needs to carry all the documents of the vehicle that he/she is driving. So, the driver usually keeps documents inside the car, for easy access to the documentations, when asked. However, this is not advisable, in case the vehicle is stolen, then the driver will lose the documentations too. Further, most of the users keep their vehicle's documents in the vehicle itself. This makes the task more difficult to file the complaint against the stolen vehicle as they don't have any of the document as proof and a thief who has stolen the vehicle may easily show the documents on the check-post. This may lead to non-recognition of the thief.

In order to overcome this problem, one or more applications were introduced to keep the softcopy of the documents of the vehicle so that if the vehicle is stolen or the law enforcement personnel stops for an inquiry, then the documents may be presented instantly. Hence, the drivers of the vehicles started carrying digital or soft copies of the documents on their mobile phones or handheld devices. However, when stopped by the law enforcement personnel for an inquiry, it is difficult for the driver to search for documents in an application on the mobile phone, with a huge amount of data to filter out, and thus causing inconvenience to the driver and the law enforcement personnel.

Further, the user needs to add his/her vehicle's information on the application to view the information anytime. However, these applications allow to view the documents of all the users on the platform, and by this, anyone can miss-use the information uploaded on the platform. Further, even after carrying all the documents digitally or physically, the user may get panicked and feel anxiety about being stopped by the law enforcement personnel, this may lead to an accident and the application does not help the law enforcement personnel to inquire multiple vehicle instantly and also does not provide an easy way to inquire about the actual person driving the vehicle at the time of stop. Therefore, in order to overcome the problem of authenticating drivers of the vehicle or residents of the property and on the other hand presenting information to the law enforcement personnel, methods were introduced.

Prior art, for various aspects contained there within, relevant to this disclosure includes U.S. Pat. Publication No. 2011/0078933 to Jason, U.S. Pat. Publication No 2020/0254926 to Gary, and U.S. Pat. Publication No. 2002/0044069 to Bruce. In each of these prior arts, a system and method are introduced to easily present all the documents upon being investigated by the law enforcement personnel. This is not an ideal solution to the problem of presenting the information in a hassle-free manner without any stress or anxiety during the inspection by the inquirer.

In particular, the Jason reference '933 discloses electronic license plate and information processing system. The prior art further discloses about providing an electronic vehicle license plate and information processing system that is interactive with various authorized agencies. However, unlike the subject matter of the disclosed invention, Jason does not discuss or suggest any indication on the vehicle upon granting access to the inquirer for checking the vehicle's documents by the automobilist. Moreover, the prior art does not alert the automobilist to stop for the inquiry of the vehicle. Further, Jason is silent on the aspect of blinking an indication light to acknowledge that the automobilist has provided the vehicle's information immediately on being stopped. Further, the prior art does not disclose anything about providing information related to the person driving the vehicle at the time of stop. Furthermore, the invention does not disclose anything about authenticating information of the residents of the property.

Reference '926 to Gary discloses an electronic license plate frame for displaying static and non-static information, the system consists of a vehicle license plate frame containing multiple low power e-paper type displays configured to replace the stickers used for vehicle registration and parking authorizations as well as provide an indication of purchased parking increments and display an advertisement or other messages. However, Gary also discloses about displaying license number of the vehicle owner but the prior art does not discuss or suggest fetching information about the license of the person driving the vehicle at the time of inquiry. Moreover, Gary is silent on the aspect of blinking an indication light to acknowledge that the automobilist has provided the information of a vehicle and automobilist immediately on being stopped. Further, the prior art does not disclose anything about providing information related to the person driving the vehicle at the time of stop. Furthermore, the invention does not disclose anything about authenticating information of the residents of the property.

Reference '069 to Bruce discloses a microchip-enhanced license plate tab and method; the improved annual license plate tab affixed to a license plate designed to inform law enforcement personnel if the annual motor vehicle registration period has expired. Further, the invention discloses about the tab including a built-in microchip that stores a unique motor vehicle identification code associate with the motor vehicle. The body may also include a bar code or other identification means that enable the law enforcement personnel to quickly access the information. However, unlike the subject matter of the disclosed invention, Bruce does not discuss or suggest anything about how to fetch information of the vehicle while keeping a distance from the vehicle, as the driver may hit the law enforcement personnel in anxiety. Moreover, Bruce silent on the aspect of blinking an indication light to acknowledge that the occupant has provided the vehicle's information immediately on being stopped. Further, the prior art does not disclose anything about providing information related to the person driving the vehicle upon the vehicle being stopped by the law enforcement personnel. Furthermore, the invention does not disclose anything about authenticating information of the residents of the property.

Given the deficiencies of the prior arts, the need remains for an effective and improved system and method to providing an alert to the a person on being inquired by the law enforcement personnel and blinking an indication light to show that the person has provided the personal information including the information of belonging vehicle or the property upon being inquired by the law enforcement personnel.

SUMMARY OF THE DISCLOSURE

According to embodiments illustrated herein, there is shown and described a novel and improved system for authenticating information during a police inquiry. The system and method provide an easy way to inquire about driver of a vehicle or resident of a property. Further, the system and method provide a hassle-free way of exchanging information between law enforcement personnel and driver of a vehicle without getting panic or feeling anxiety. Moreover, the system and method make the task easy of inquiring an area or the vehicles by helping the law enforcement personnel in authenticating the drivers without stopping the vehicle or authenticating the residents without entering inside the property.

In an exemplary embodiment, the system is disclosed with respect to authentication of the vehicle's information. The system comprises a first handheld device, associated with a first user, configured to generate a request for authenticating the vehicular information of a vehicle and occupant. In one case, the first handheld device is associated with a law enforcement personal. As discussed above, the first user may be a normal residential person or a police officer. Further, the first handheld device is connected to a network for authentication of vehicular information with information stored in law enforcement central databases. The first handheld device shares information with a predefined law enforcement or police station, based on the credentials of the first user. Further, the system comprises a second handheld device, associated with a second user, configured to acknowledge the request. The second handheld device is associated with an owner or an authorized driver of the vehicle or an owner of a residential property. Further, the vehicular information comprises information related to registration of the vehicle, insurance of the vehicle, license of the second user, and particularly the information about the second user at the time of stop. Such method provides convenience to the first user and the second user and this eliminated stopping the vehicle for the verbal communication.

In one embodiment, the first handheld device and the second handheld device may be selected from a group of devices including a computing device, laptop, smartphone, tablet, computer, smart speaker, or input or output (I/O) devices. Further, the first handheld device and the second handheld device are selected from a group of devices including a mobile data terminal (MDT) and a mobile computer terminal (MCT). The first handheld device and the second handheld device operates on a Police Enforcement and Civilian Encounters (PEACE) device application. In another case, the PEACE device application is a web application. In one embodiment, the PEACE device application may facilitate the first user to generate a request and the second user to accept the request and share vehicular information. Further, the PEACE device application also provides information to the first handheld device about passengers sitting inside the vehicle at the time of stop. The PEACE device application uses a Bluetooth technology to detect nearby phones to identify information of the passengers in the vehicle. Further, the PEACE device application also provides information about the person who is authorized to drive the vehicle. Moreover, the PEACE device application provides facility of instant messaging between the first user and the second user.

Such use of the application provides an instant communication between the first handheld device and the second handheld device. Moreover, the first user does not need to take a risk by standing in front of upcoming vehicle to request for stopping the vehicle.

Furthermore, the system comprises an informatory device mounted on the vehicle or at a residential place. The informatory device is configured to communicate with the first handheld device and the second handheld device. In one embodiment, the informatory device comprises a magnetic body coupled at a first side of the informatory device to mount the vehicular informatory device on the vehicle. Further, the informatory device comprises a plastic body coupled to the magnetic body, at a second side of the informatory device. The first side corresponds to a lower side and the second side corresponds to an upper side of the vehicular informatory device. Such use of the informatory device promotes a friendly approach and a positive police environment and civilian interactions.

Further, the informatory device helps in avoiding physical interaction between the first user and the second user, and thus reduces the chances of conflicts and build a friendly atmosphere. Further, the second user receives information of the actual person driving the vehicle at the time of stop.

Further, the informatory device comprises a circuitry housed in the plastic body. The circuitry facilitates communication among the first handheld device, the second handheld device, and the informatory device, for authenticating the vehicular information of a vehicle and occupant. Further, the circuitry comprises a transceiver, configured to receive an acknowledgement signal from the second handheld device upon accepting a request for sharing vehicular information by the second user. Further, the transceiver transmits a signal to the first handheld device for sharing the vehicular information, in response to the request. Further, the circuitry comprises a controller coupled to the transceiver and a lightning device. The controller is configured to trigger the lightning device upon receiving the acknowledgement signal by the transceiver. In one embodiment, the controller may be a processor. Further, the processor may include suitable logic, circuitry, and/or interfaces that are operable to execute instructions stored in the memory to perform various functions. The processor may execute an algorithm stored in the memory for beam failure management. The processor may also be configured to decode and execute any instructions received from one or more other electronic devices or server(s). The processor may include one or more general-purpose processors (e.g., INTEL® or Advanced Micro Devices® (AMD) microprocessors) and/or one or more special-purpose processors (e.g., digital signal processors or Xilinx® System On Chip (SOC) Field Programmable Gate Array (FPGA) processor).

Further, the lightning device blinks in a predefined pattern, upon being triggered by the controller. Further, the lightning device comprises at least one of a light-emitting diode (LED) light or a condensed fluorescent light (CFL). The lightning device blinks in a predefined pattern when triggered by the controller.

Upon generating the request by the first user, the LED flickers white light to acknowledge the first user that the second user is willing to accept the request. After accepting the request by the second user, the LED emits solid white light to confirm the first user about the request that is accepted by the second user. If the user denies the request, then the LED blinks a red light.

In one embodiment, the first handheld device, the second handheld device, and the informatory device communicate using at least one of a Radio-Frequency Identification (RFID), cellular, Wi-Fi, Bluetooth, or ZigBee. Further, the circuitry is wireless and is coupled to a Lithium-ion or solar-powered battery. The circuitry stores vehicular information of the vehicle and occupant.

Such use of the informatory device facilitates time saving and compliance with social distancing between the first user and the second user. Further, the use of informatory device minimizes interaction between the first user and the second user, and thus reduces stress and anxiety for both the first user and the second user. Further, the minimized interaction reduces the potential for a confrontation, misunderstanding, arrest, or possibly even having the second user shot and killed in what should be a routine stop.

According to another embodiment, if the first user gives a warning or put a penalty on the second user because of number of situations including speeding, driver running traffic lights or other traffic violation, then this event may be stored in a memory unit of the informatory device with specific time frame.

According to another embodiment illustrated herein, a method for authenticating vehicular information of a vehicle is disclosed. The method comprises generating a traffic stop notification, by a first handheld device associated with a first user, to access vehicular information of the vehicle of a second user. Further, the method comprises transmitting, by a second handheld device associated with the second user, an acknowledgement signal upon receiving the traffic stop notification, to a vehicular informatory device mounted on the vehicle. Further, the method comprises responding to the acknowledgement signal, by the second handheld device associated with the second user by accepting and/or rejecting the traffic stop notification. Further, the method comprises exchanging the vehicular information of the second user and badge information of the first user between the first handheld device and the second handheld device, in response to the request.

In one embodiment, generating the traffic stop notification comprises manually pushing a traffic stop button on the PEACE device application, by the first user, to access the vehicular information of the vehicle and the occupant. In another embodiment, generating the traffic stop notification comprises automatically requesting the second handheld device associated with the second user to respond to the traffic stop notification. In one embodiment, the informatory device activates automatically by a receiver that is installed in a vehicle of the second user, the informatory device sends the information to the first user to avoid physical interaction. Further, the receiver may include one of a radio frequency identification (RFID), or near field communication (NFC). Further, the request is generated by an application installed on the first handheld device and the request is accepted by an application installed on the second handheld device.

Such a method for authenticating vehicular information facilitates time saving and also facilitates compliance with social distancing between the first user and the second user. Further, use of such a method minimizes interaction between the first user and the second user, thus reducing stress and anxiety for both the first user and the second user. Further, the minimized interaction reduces the potential for a confrontation, misunderstanding, arrest, or possibly even having the second user shot and killed in what should be a routine stop.

According to another embodiment illustrated herein, an informatory device for authenticating vehicular information of a vehicle is disclosed. The informatory device comprises a magnetic body coupled at a first side of the informatory device to mount the informatory device on the vehicle. Further, the informatory device comprises a plastic body coupled to the magnetic body, at a second side of the informatory device. The first side corresponds to a lower side and the second side corresponds to an upper side of the informatory device.

Further, the informatory device comprises a circuitry housed in the plastic body. The circuitry facilitates communication among a first handheld device, a second handheld device, and the vehicular informatory device, for authenticating the vehicular information of the vehicle. Further, the circuitry comprises a transceiver, configured to receive an acknowledgement signal from the second handheld device upon accepting a request for sharing vehicular information by the second user. The request is generated by a first user associated with a first handheld device. Further, the transceiver transmits a signal to the first handheld device for sharing the vehicular information, in response to the request. Further, the circuitry comprises of a controller coupled to the transceiver and a lightning device. The controller is configured to trigger the lightning device upon receiving the acknowledgement signal by the transceiver. Such use of the informatory device facilitates time saving and also facilitates compliance with social distancing between the first user and the second user.

In one example embodiments illustrate herein, a solution to help the occupant in providing personnel information and vehicular information to the law enforcement personnel in a stress-free manner with least interaction. The system and method provides an easy way to check the information of the particular person driving the vehicle at the time of stop. Further, the system and method alerts the occupant upon being stopped by any law enforcement personal and thereby avoid critical confrontations and misunderstanding between the occupant and the law enforcement personal.

In an exemplary embodiment, the system is disclosed with respect to authentication of a resident's information of a property. The system comprises a first handheld device, associated with a first user, configured to generate a request for authenticating the information of residents of a property. The first handheld device is associated with a law enforcement personal or a police officer. The first handheld device is connected to a network for authentication of resident's information with information stored in law enforcement central databases. The first handheld device shares information with a predefined law enforcement or police station, based on the credentials of the first user. Further, the system comprises a second handheld device, associated with a second user, configured to acknowledge the request. The second handheld device is associated with a resident of the property. Further, the resident's information comprises information of all the resident's in the property, information of owner of the property, license of the business if the property is commercial, and information of tenants in case of rented property. Such method provides convenience to the first user and the second user and this eliminates the need to enter in each property of the area and also avoids verbal communication with the residents.

In an embodiment, upon generating the request by the first handheld device of the law enforcement personnel, the informatory device that may be attached on outer wall of the property, starts blinking to ensure the law enforcement personnel that the resident is willing to accept the information. Further, after accepting the request by the resident of the property, the informatory device sends information of all the resident's in the property to the law enforcement personnel. After sending the information, the informatory device emits bright white light to acknowledge the law enforcement personnel that the information of the residents of the property is transmitted.

Other features and aspects of this disclosure will be apparent from the following description and the accompanying drawings.

BRIEF DESCRIPTION OF THE DRAWINGS

While the specification concludes with claims particularly pointing out and distinctly claiming particular embodiments of the present disclosure, various embodiments of the present disclosure can be more readily understood and appreciated from the following descriptions of various embodiments of the present disclosure when read in conjunction with the accompanying drawings, in which:

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Some embodiments of this disclosure, illustrating all its features, will now be discussed in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred systems, and methods are now described.

Embodiments of the present disclosure will be described more fully hereinafter with reference to the accompanying drawings in which like numerals represent like elements throughout the several figures, and in which example embodiments are shown. Embodiments of the present disclosure may, however, be embodied in alternative forms and should not be construed as being limited to the embodiments set forth herein. The examples set forth herein are non-limiting examples and are merely examples among other possible examples.

Figure 1:
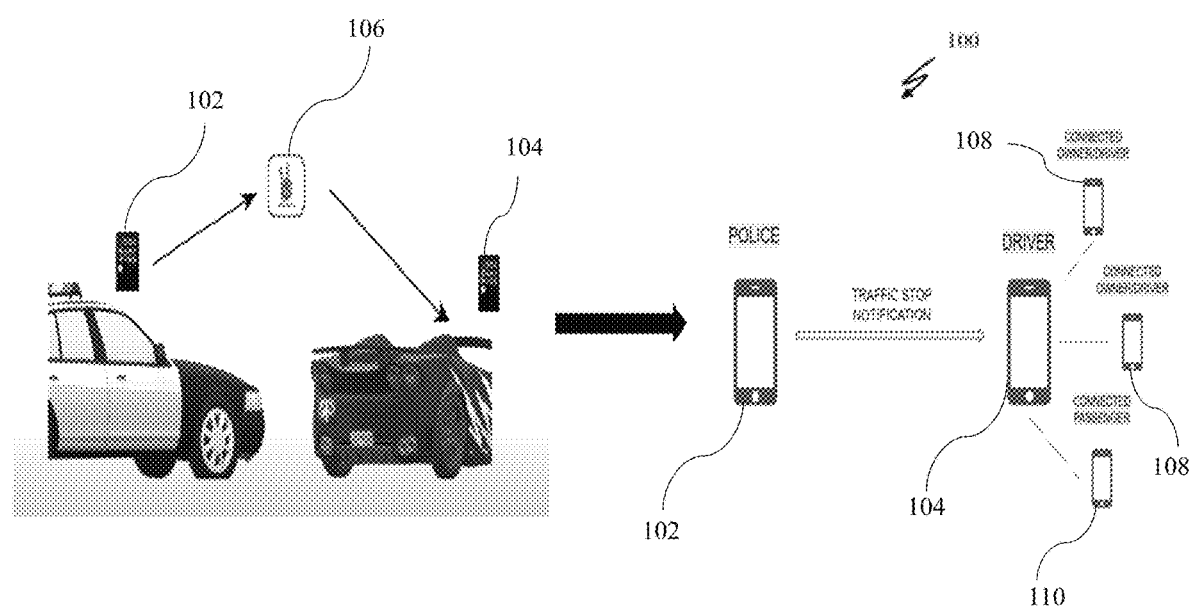
FIG. 1 illustrates an overview of a system for authenticating information during a police inquiry, according to an embodiment of the present disclosure.

FIG. 1 illustrates a block diagram showing a system 100 for authenticating information during a police inquiry, according to an embodiment of the present disclosure. The system disclosed in the FIG. 1 makes the task easy of inquiring an area or the vehicles by helping the law enforcement personnel in authenticating the drivers without stopping the vehicle or authenticating the residents without entering inside the property.

In an exemplary embodiment the system is disclosed with respect to authentication of the vehicle's information, the system 100 may comprise a first handheld device 102, a second handheld device 104, and an informatory device 106. The first handheld device 102 may be associated with a first user. In one embodiment, the first user may be a law enforcement personnel or a police officer. Further, the second handheld device 104 may be associated with a second user. In one embodiment, the second user may be a driver of the vehicle. The first handheld device 102 and the second handheld device 104 may be selected from a group of devices including a mobile data terminal (MDT) and a mobile computer terminal (MCT). Further, the first handheld device 102 and the second handheld device 104 may be configured to operate on a common or a separately installed application. In one embodiment, the application installed on the first handheld device 102 may be a Police Enforcement and Civilian Encounters (PEACE) device application. It can be noted that the PEACE device application may facilitate the first user, to access vehicular data associated with any vehicle which is at a predefined distance from the first handheld device 102.

In one embodiment, the first handheld device 102 and the second handheld device 104 may be selected from a group of devices including a computing device, laptop, smartphone, tablet, computer, smart speaker, or input or output (I/O) devices. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Further, output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple IPHONE. Some devices allow gesture recognition inputs by combining some of the inputs and outputs.

In one embodiment, the first handheld device 102 may allow for facial recognition which may be utilized as an input for different purposes including authentication and other commands. In another embodiment, the first handheld device 102 and the second handheld device 104 may include both input and output capabilities, including, e.g., haptic feedback devices, touchscreen displays, or multi-touch displays. Further, touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Further, some multi-touch devices may allow two or more contact points with the surface, allowing advanced functionality including, e.g., pinch, spread, rotate, scroll, or other gestures. In addition, some touchscreen devices, may include, e.g., Microsoft PIXELSENSE or Multi-Touch Collaboration Wall, may have larger surfaces, such as on a table-top or a wall, and may also interact with other electronic devices.

Further, some I/O devices, display devices or groups of devices may be augmented reality devices. The I/O devices may be controlled by an I/O controller. The I/O controller may control one or more I/O devices, such as e.g., a keyboard and a pointing device, e.g., a mouse or optical pen. Furthermore, an I/O device may also allow storage and/or an installation medium for the computing device. In still other embodiments, the computing device may allow USB connections (not shown) to receive handheld USB storage devices. In one embodiment, the I/O device may be a bridge between a system bus and an external communication bus, e.g. a USB bus, a SCSI bus, a FireWire bus, an Ethernet bus, a Gigabit Ethernet bus, a Fiber Channel bus, or a Thunderbolt bus. In one embodiment, the first handheld device 102 and the second handheld device 104 may be an optional component and would be utilized in a situation in which the paired wearable device is utilizing the first handheld device 102 and the second handheld device 104 as additional memory or computing power or connection to the internet. In one embodiment, the first handheld device 102, the second handheld device 104, and the informatory device 106 communicate using at least one of a Radio-Frequency Identification (RFID), cellular network, Wi-Fi, Bluetooth, or ZigBee.

Further, the PEACE device application may run on the first handheld device 102 and the second handheld device 104. In one case, the PEACE device application is a mobile application. In another case, the PEACE device application is a web application. In one embodiment, the PEACE device application may facilitate the first user to generate a request and the second user to accept the request and share vehicular information. Further, the PEACE device application may provide a graphical user interface (GUI) to the first user and the second user for various operations such as, but not limited to, facilitating the first user and the second user to generate a request and the second user to accept the request and share vehicular information. Further, the GUI may either accept inputs from the first user and the second user or facilitates outputs to the first user and the second user or may perform both actions. Further, the PEACE device application also provides information to the first handheld device 102 about passengers sitting inside the vehicle at the time of stop. The PEACE device application uses a Bluetooth technology to detect nearby phones to identify information of the passengers in the vehicle. Further, the PEACE device application also provides information about the person who is authorized to drive the vehicle. Moreover, the PEACE device application provides facility of instant messaging between the first user and the second user.

In one embodiment, the PEACE device application may provide omnipresent awareness and communication between various stakeholders. The awareness may be triggered by physical and virtual cues present within proximity of the law enforcement officer prior to engagement of requests and information sharing. Further, the visual cues may provide information about occupants of the vehicle. In one embodiment, the informatory device 106 along with the PEACE device application may act as a voice assisting partner. The PEACE device application acts as voice assisting partner to the driver. For example, the driver says, "HEY PEACE" and the PEACE device application becomes active to accept voice commands/input, and further, provides natural language processing that interacts with the PEACE device application.

In one embodiment, the PEACE device application may enable authentication and establishment of a communication protocol between a civilian automobile and law enforcement officer's vehicle for the exchange of the driver and/or the occupant, the law enforcement officer, and vehicle location information using the informatory device 106. In another embodiment, the PEACE device application may provide a mobile software/algorithm that allows one or more mobile devices and the informatory device 106 to be connected to a network. The PEACE device application may be connected to a shared network to share and authenticate the vehicular information received from any other network connected device.

In one embodiment, the PEACE device application may ensure that each occupants' information is not shared with other occupants and instead the information is shared with law enforcement officer's handheld device and other stakeholders selected by the owner 108 of the vehicle.

In one embodiment, the first handheld device 102 and the second handheld device 104 may include a user device GUI or guided user interface(s) that may either accept inputs from users (the first user and the second user) or facilitates outputs to the users (the first user and the second user) or may perform both the actions. In one case, the first user and the second user may interact with the interface(s) using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, or a combination of the above. Further, the interface(s) may either be implemented as a Command Line Interface (CLI), a Graphical User Interface (GUI), a voice interface, or a web-based user interface. In one embodiment, the user device GUI may facilitate the first user and the second user to input data related to requests and acknowledgements of requests. In one embodiment, the user device GUI may send notifications in a user-friendly or interactive form to the first user and the second user. Further, the user device GUI may be voice-enabled and may allow the first user and the second user to use the GUI using voice commands.

At first, the first handheld device 102 may be configured to generate a request for authenticating vehicular and occupant information of the vehicle. Further, the vehicular information may comprise information related to registration of the vehicle, insurance of the vehicle, and license of the second user. In one embodiment, the request may be generated for authenticating information related to the second user. In one embodiment, the first user may raise the request from the application installed on the first handheld device 102. Further, the request may be transmitted to the second handheld device 104 of the second user. It can be noted that a process for generating the request may be explained in conjunction with FIG. 4.

In one embodiment, the second handheld device 104 may be configured to receive the request for authenticating the vehicular information of the vehicle and the occupant, from the first handheld device 102. Further, the second user associated with the second handheld device 104 may approve or reject the request of the first user. In one embodiment, the second user may approve the request raised by the first user, to grant access to the vehicular information related to the vehicle of the second user. Further, the second handheld device 104 may transmit an acknowledgement signal to the informatory device 106, for indicating compliance by the second user. It can be noted that a process for approving the request or granting access to vehicular information may be explained in conjunction with FIG. 4.

In one embodiment, the informatory device 106 may be a device mounted on the vehicle. Further, the informatory device 106 may be explained in conjunction with FIGS. 2A, 2B, and 2C. Further, the first handheld device 102 or law enforcement officer device associated with the first user may generate a traffic stop notification to the second handheld device 104 associated with the second user. The second handheld device 104 associated with the second user may include, but is not limited to, an owner and one or more authorized drivers 108 of the vehicle, and one or more connected passengers 110. In one embodiment, the owner and the one or more authorized drivers 108 and the one or more connected passengers 110 constitute interested parties. The first handheld device 102 may send the traffic stop notification each of the interested parties associated with the vehicle.

Further, the system 100 may comprise multiple transmitters installed at multiple location on the vehicle. It may be noted that the multiple transmitters may be provided to ensure security of the vehicle against theft and damage. Each of the multiple transmitters may produce inaudible signals, thereby not to hinder ambience of the vehicle. The multiple transmitters may be connected to a battery system of the vehicle for operation. In one embodiment, the multiple transmitters may have a self-contained battery backup when the vehicle is not in operation. The battery backup may run the multiple transmitters for several days. The transmitters may be activated by the law enforcement officers. In one exemplary embodiment, the multiple transmitters may be referred as a Transmitter communicatively coupled to a database.

In one example, when a state crime computer receives a notification for stolen vehicle, it connects to the database to determine if the stolen vehicle is equipped with the Transmitter. In one case, if the stolen vehicle is installed with the Transmitter, then the state crime computer automatically activates the Transmitter. In one embodiment, the Transmitter may assist the law enforcement officer to easily communicate during the traffic stop. It can be noted that the Transmitter may help the driver 108 of the vehicle to refrain from using mobile device during the traffic stop, as the Transmitter may communicate automatically with the law enforcement officer's vehicle. In one embodiment, the Transmitter may share information from the PEACE device application of the driver to the law enforcement officer's handheld device, after connection is established. Further, the Transmitter may operate on a special radio frequency allocated by an encrypted radio channel exclusively for stolen vehicle recovery.

In one embodiment, the Transmitter is a small, silent transmitter hidden within the consumer's vehicle. After police enter a stolen vehicle report in the state crime computer, the Transmitter is activated and begins to send a signal that police can track using a Police Tracking Computers to recover the stolen vehicle. In another embodiment, the Transmitter may have an auto security system builds to provide an additional layer of security. It can be noted that an Early Warning is provided which notifies consumers (the owner or the driver of the vehicle 108) when their vehicle has been moved without their permission. Such a system may enable the owner 108 to report the vehicle theft faster.

In one embodiment, the radio towers of the law enforcement operate on a radio network to communicate with the Transmitter and thereby activate the multiple transmitters installed when the vehicle is stolen. At first, the law enforcement accepts a report of a stolen vehicle and enters the stolen vehicle report in the state crime computer. Further, the multiple transmitters are activated, which had been installed on the stolen vehicle. Consequently, the law enforcement officer tracks the multiple transmitters and thereby recovers the stolen vehicle.

Figure 2A:
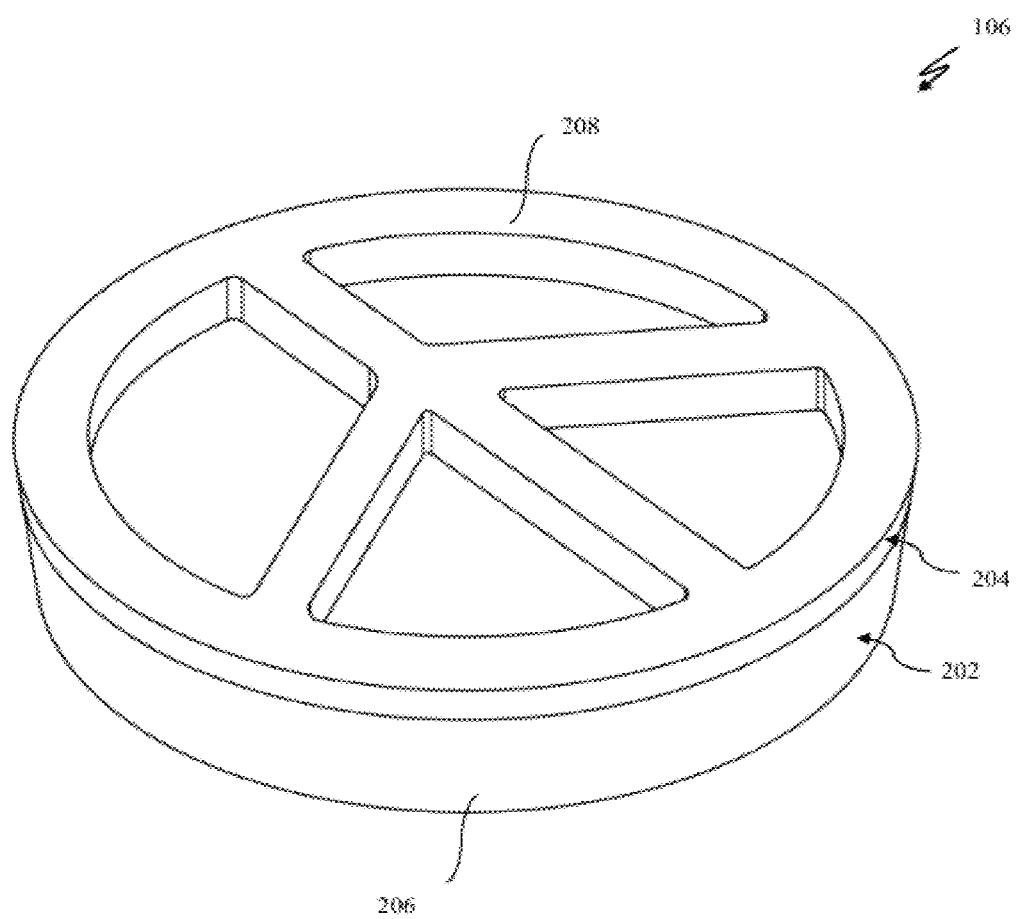
FIG. 2A illustrates an overview of an informatory device of the system for authenticating information during a police inquiry; according to an embodiment of the present disclosure.

FIG. 2A illustrates an overview of the informatory device 106 of the system 100 for authenticating vehicular information of the vehicle and the occupant. The informatory device 106 may comprise a first side 202 and a second side 204. In one embodiment, the informatory device 106 may comprise a magnetic body 206 coupled at the first side 202 of the informatory device 106. In one embodiment, the first side 202 may correspond to a bottom side of the informatory device 106. Further, the informatory device 106 may comprise a plastic body 208 coupled at the second side 204 of the informatory device 106. In one embodiment, the second side 204 may correspond to a top side of the informatory device 106.

Figure 3:
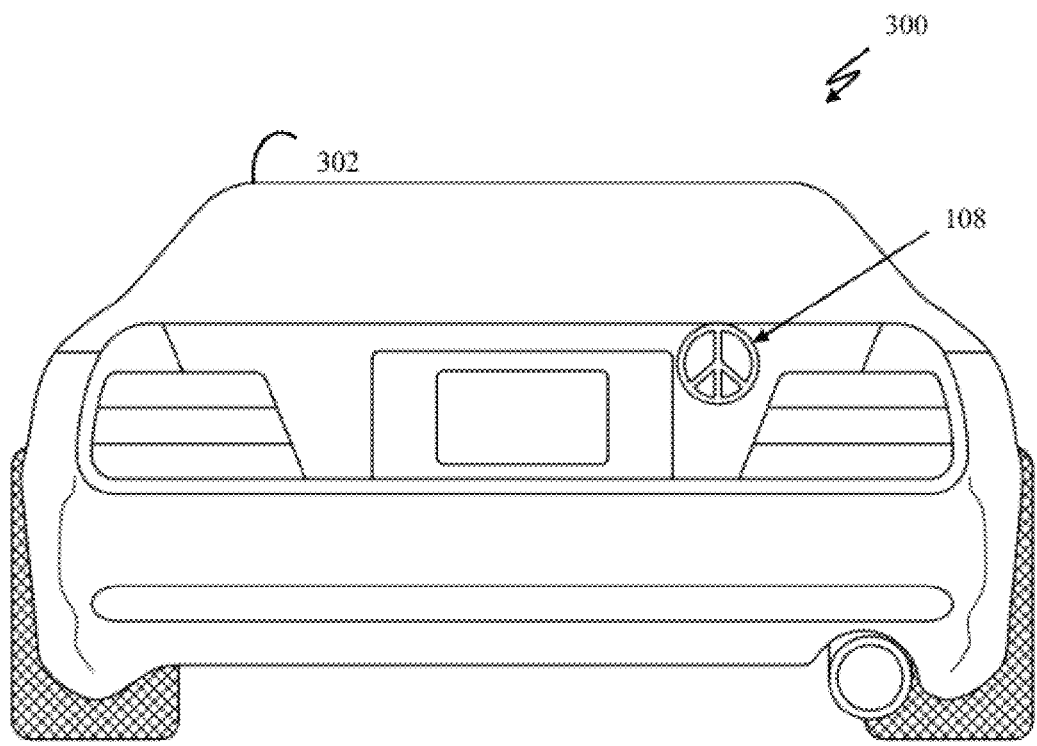
FIG. 3 illustrates an exemplary embodiment showing the informatory device attached mounted on the vehicle, according to an embodiment of the present disclosure.

Further, the magnetic body 206 may be used for mounting the informatory device 106 on the vehicle, as shown in FIG. 3. The magnetic body 206 may provide a base to the informatory device 106 and due to the magnetic properties, the magnetic body 206 may be attracted to the vehicle i.e. made up of iron or any other magnetic material. In one embodiment, the magnetic materials may be selected from a group comprising of iron, nickel, cobalt, some alloys of rare-earth metals, and some naturally occurring minerals such as lodestone. Further, the magnetic body 206 may provide a temporary coupling of the informatory device 106 with the vehicle, for easy mounting and de-mounting of the informatory device 106 from the vehicle. Further, the magnetic body 206 may be coupled to the plastic body 208 (as shown in FIG. 2A).

In one embodiment, the plastic body 208 may be visible to a user. Further, the plastic body 208 may correspond to a top side of the informatory device 106. In one embodiment, plastic body 208 may be forged in the of a PEACE symbol. Further, the plastic body 208 may be of any other shape, without departing from the scope of the disclosure. In one example embodiment, the informatory device 106 is 3 inches in size.

Figure 2B:
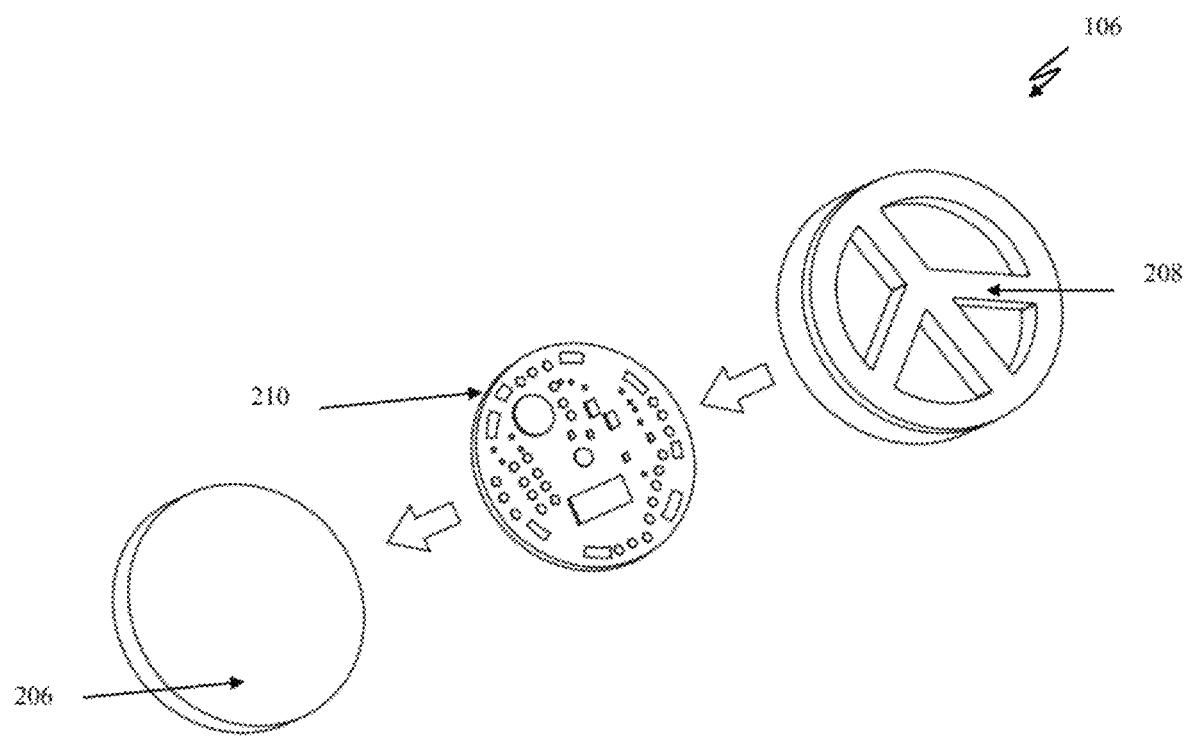
FIG. 2B illustrates an exploded view of the informatory device of the system for authenticating information during a police inquiry, according to an embodiment of the present disclosure.

As shown in FIG. 2B, the informatory device 106 may comprise a circuitry 210. In one embodiment, the circuitry 210 may be a pre-certified wireless module. In one embodiment, the circuitry 210 may be enclosed between the magnetic body 206 and the plastic body 208. Further, the circuitry 210 may be wired or wireless. In one embodiment, the circuitry 210 may be battery operated. Further, the circuitry 210 may be coupled to a Lithium-ion or solar-powered battery. The circuitry 210 may facilitate communication among the first handheld device 102, the second handheld device 104, and the informatory device 106, for authenticating the vehicular information of the vehicle and the occupant.

Figure 2C:
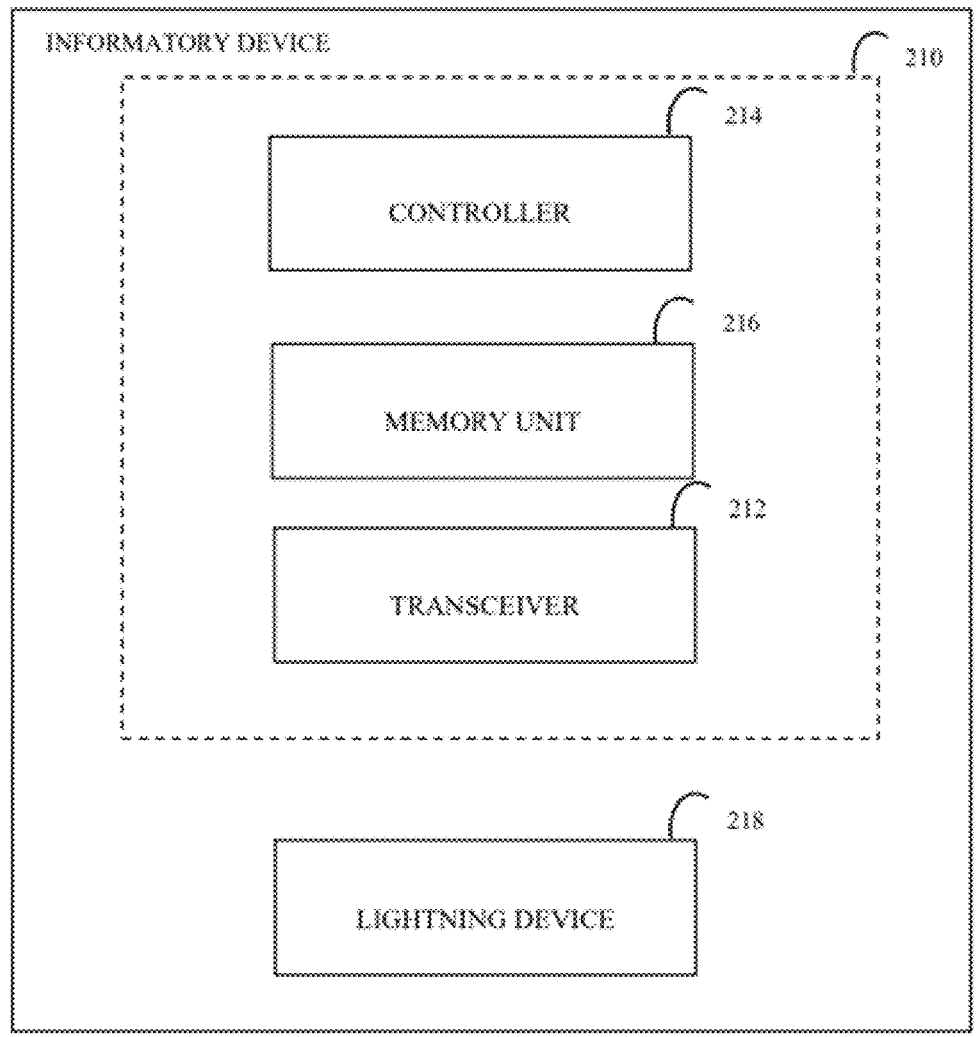
FIG. 2C illustrates a block diagram of the informatory device of the system for authenticating information during a police inquiry, according to an embodiment of the present disclosure.

Further, as shown in FIG. 2C, the circuitry 210 may comprise a transceiver 212, a controller 214, and a memory 216. In one embodiment, the transceiver 212 may be configured to receive an acknowledgement signal from the second handheld device 104 upon accepting the request for sharing vehicular information by the second user. Further, the transceiver 212 may transmit a signal, to the first handheld device 102, sharing the vehicular information in response to the request.

In one embodiment, the controller 214 may be a processor. Further, the processor may include suitable logic, circuitry, and/or interfaces that are operable to execute instructions stored in the memory to perform various functions. The processor may execute an algorithm stored in the memory for beam failure management. The processor may also be configured to decode and execute any instructions received from one or more other electronic devices or server(s). The processor may include one or more general-purpose processors (e.g., INTEL® or Advanced Micro Devices® (AMD) microprocessors) and/or one or more special-purpose processors (e.g., digital signal processors or Xilinx® System On Chip (SOC) Field Programmable Gate Array (FPGA) processor). The processor may be further configured to execute one or more computer-readable program instructions, such as program instructions to carry out any of the functions described in the description. In one embodiment, the controller 214 may correspond to a microcontroller, microprocessor, or Arduino-microcontroller. Further, the controller 214 may be connected to the memory 216. In one embodiment, the vehicular information may be stored in the memory 216. The memory 216 may store a set of instructions and data. Further, the memory 216 may include one or more instructions that are executable by the processor to perform specific operations. Some of the commonly known memory implementations include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, cloud computing platforms (e.g. Microsoft Azure and Amazon Web Services, AWS), or other type of media/machine-readable medium suitable for storing electronic instructions. It can be noted that the hardware and software of the memory 216 may be spoof proof. Further, the vehicular information stored in the memory 216 may be encrypted, for enhanced security.

Further, the transceiver 212, the controller 214, and the memory 216 may be coupled to a lightning device 218. In one embodiment, the lightning device 218 may be comprised in the informatory device 106. In one embodiment, the lightning device 218 may be coupled with the plastic body 208. Further, the lightning device 218 may comprise at least one a light-emitting diode (LED) light or a condensed fluorescent light (CFL), which are lightweight and consume very less amount of energy. Further, the lightning device 218 may be of a predefined shape. In one embodiment, the lightning device 218 may be a peace-shaped symbol and displays the symbol of peace by blinking. Further, the controller 214 may be configured to trigger the lightning device 218 upon receiving the acknowledgement signal by the transceiver 212, as explained in conjunction with FIG. 4.

In one embodiment, the informatory device 106 may be weatherproof, to withstand heat, cold, moisture, water, impact, and other outdoor environmental conditions, without departing from the scope of the disclosure. Further, the informatory device 106 may be spoof proof. In one embodiment, the informatory device 106 may be capable of being locked or disabled or de-authorized, if lost or stolen. Further, the informatory device 106 may interact with an application or the PEACE device application, to enable the second user with information related to the proximity of the vehicle and the condition of the vehicle. Further, the second user may provide information, to the informatory device 106, of the vehicle associated with the second user. In one embodiment, the informatory device 106 may be enabled when the informatory device 106 is registered to a user, under whom the vehicle is registered. In one embodiment, the informatory device 106 activates automatically by a receiver that is installed in a vehicle of the first user, the informatory device 106 sends the information to the first user to avoid physical interaction. Further, the receiver may include one of a radio frequency identification (RFID), or near field communication (NFC).

In one embodiment, the first handheld device 102 and the informatory device 106 may be connected to the network. The first handheld device 102 may be connected to the network, to share and authenticate vehicular information received from the second handheld device 104. In one embodiment, the network may be connected to law enforcement central databases. Further, the law enforcement center databases may include National Law Enforcement Telecommunications System (NLETS), National Crime Information Center (NCIC), DMV database, Interstate Identification Index (III). In one embodiment, the informatory device 106 may be connected to the network, for sharing information received from the second handheld device 104 to the network, for directly sharing the vehicular information with the law enforcement center databases. Further, the network may be a wired and/or a wireless network. The network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The network may allow ubiquitous access to shared pools of configurable system resources and higher-level services that can be rapidly provisioned with minimal management effort, often over the Internet, and relies on sharing of resources to achieve coherence and economies of scale, like a public utility, while third-party clouds enable organizations to focus on their core businesses instead of expending resources on computer infrastructure and maintenance.

In one embodiment, the lighting device 218 of the informatory device 106 may be configured to generate moods for the law enforcement officer, the driver, and the occupants after a request of traffic stop is being generated by the first handheld device 102 associated with the law enforcement officer. The moods may include, but is not limited to, calming mood to the law enforcement officer. The informatory device 106 may provide information about the driver and the occupants of the vehicle at the time of stop. In one embodiment, the first handheld device 102 may ask permission via the PEACE device application to transfer information about the occupants of the vehicle. It can be noted that the informatory device 106 may automatically recognize the occupants of the vehicle. However, the PEACE device application may ask each of the occupants for permission to track or connect to the PEACE device application from their handheld devices (if any). In this manner, all the handheld devices including the first handheld device 102 and the second handheld device 104 may be part of the communication network.

In one alternate embodiment, the PEACE device application may be enforced to pedestrians. In this case, the pedestrians may have the PEACE device application installed on their mobile phones, smart watches, etc. The implementation of the PEACE device application on the pedestrians ensures public safety, by informing the law enforcement officer about any mishappening. Further, the PEACE device application may track the law enforcement officer in proximity to reach the desired location of a pedestrian.

FIG. 3 illustrates an exemplary embodiment showing a vehicle system 300 comprising the informatory device 106 mounted on a vehicle 302. The informatory device 106 may be mounted on a rear side of the vehicle 302. It can be noted that the informatory device 106 may be mounted on any surface of the vehicle 302, without departing from the scope of the disclosure. In one embodiment, the informatory device 106 may be mounted, so that the informatory device 106 is visible to the first user of the first handheld device 102. It can be noted that the vehicle 302 may be any vehicle selected from a group of vehicles including, a car, a motorbike, a bicycle, without departing from the scope of the disclosure.

Figure 4:
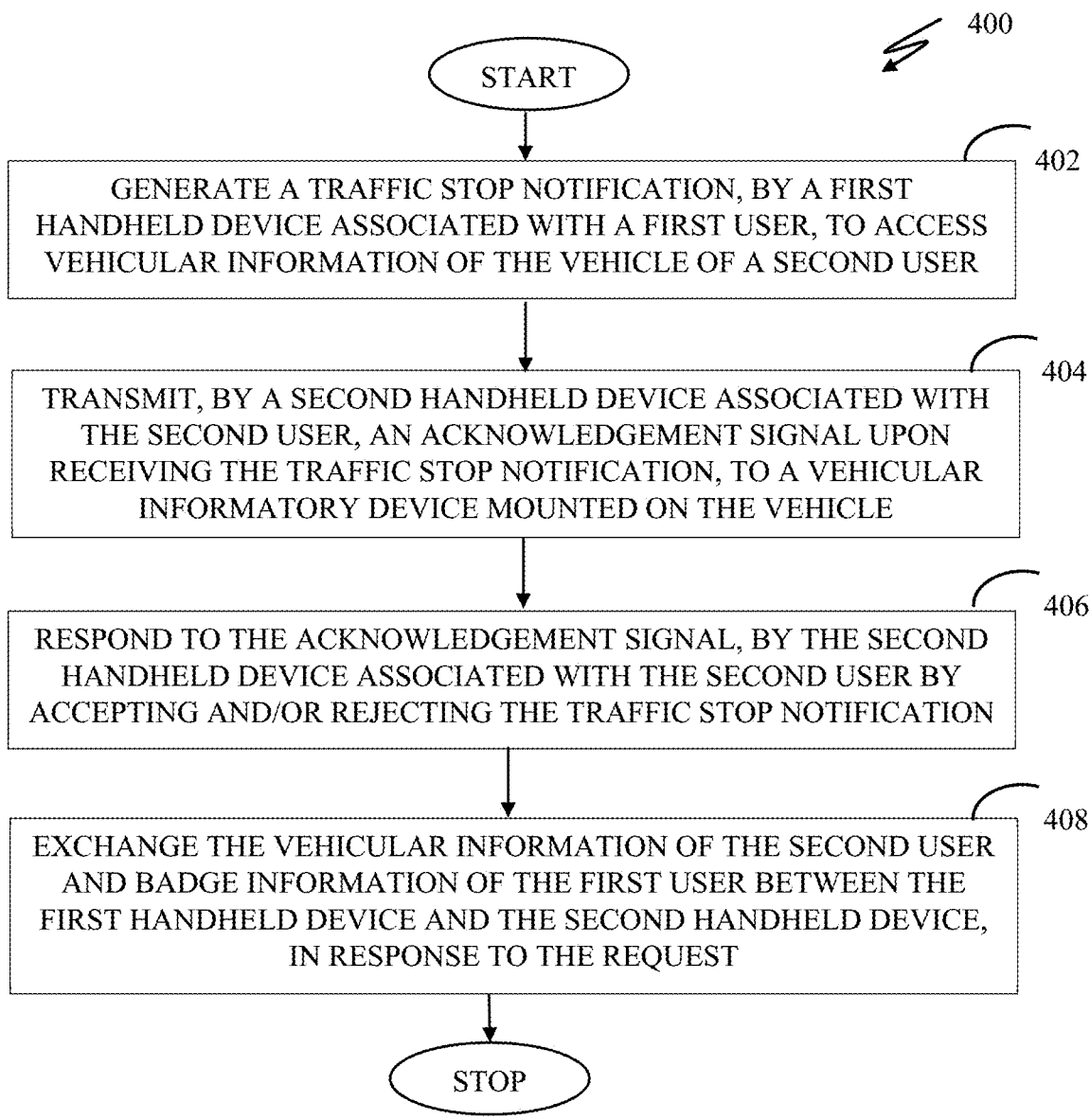
FIG. 4 illustrates a flow chart of a method for authenticating vehicular and occupant information of the vehicle, according to an embodiment of the present disclosure.

FIG. 4 illustrates a flowchart 400 of a method for authenticating vehicular information of the vehicle and the occupant. The flowchart 400 starts at step 402 and proceeds to step 408.

Figure 12:
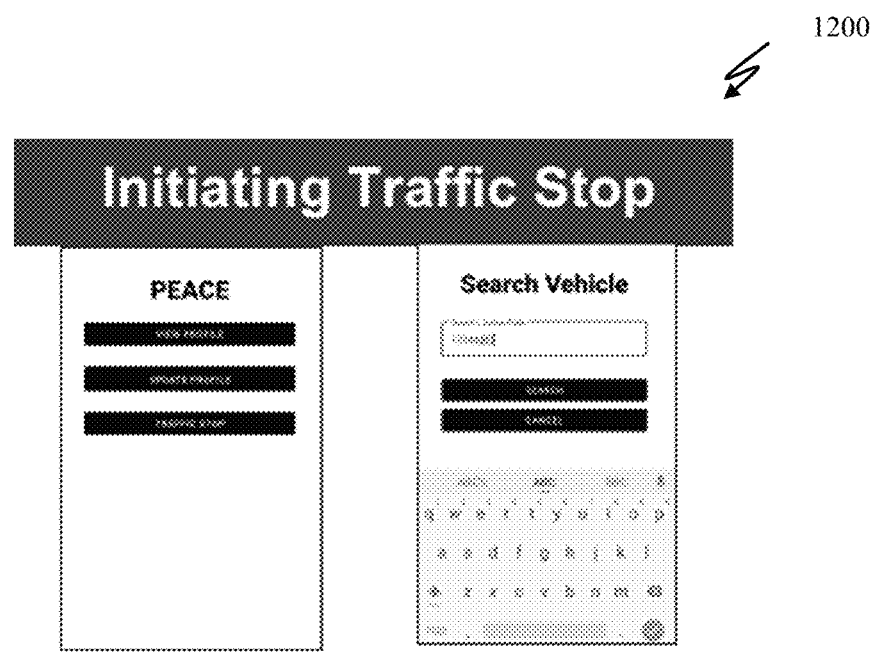
FIG. 12 illustrates another GUI for initiating a traffic stop by a law enforcement officer, according to another embodiment.

At step 402, the first user associated with the first handheld device 102 may generate a traffic stop notification, to access vehicular information of the vehicle of the second user. In one embodiment, the first user may be a law enforcement personnel or a police officer. In one embodiment, the traffic stop notification may be generated manually, by the first user, as shown in FIG. 12. Further, the first user may generate the traffic stop notification by pushing a stop button/icon on the PEACE device application installed on the first handheld device 102. In one embodiment, the traffic stop notification may be generated and the first user stops the vehicle for a routine check on vehicular information or a suspicious check on the vehicular information. In one embodiment, the vehicular information may correspond to the documents of the vehicle by the owner and personal identification of the authorized driver, driving permit of the authorized driver, number, and identification of connected passengers of the vehicle, without departing from the scope of the present disclosure. For example, the law enforcement officer pushes the traffic stop notification button on the PEACE device application and the authorized driver stops the vehicle when the informatory device 106 is within 10 meters from the law enforcement officer's vehicle of the first handheld device 102.

At step 404, the second handheld device 104 may transmit an acknowledgement signal upon receiving the traffic stop notification to the vehicular informatory device 106 mounted on the vehicle. In one embodiment, the acknowledgement signal may be sent through the PEACE device application installed on the second handheld device 104. Further, the acknowledgement signal may be transmitted to the informatory device 106, mounted on the vehicle. In one embodiment, the transceiver 212 of the informatory device 106 may receive the acknowledgement signal. In one embodiment, the acknowledgement signal may be sent via the PEACE device application onto the first handheld device 102 associated to the first user by the owner or the one or more authorized drivers 108 of the vehicle or one or more connected passengers 110 of the vehicle. The acknowledgement signal may be sent by either one or all the interested parties actively or remotely present from the first handheld device 102. It can be noted that the transmittal of the acknowledgement signal corresponds to a confirmation that the traffic stop notification has been received by either one or all the interested parties associated with the vehicle.

At step 406, the second handheld device 104 associated with the second user may be respond to the acknowledgement signal by accepting and/or rejecting the traffic stop notification. The second user may accept and/or reject the traffic stop notification after the response of the acknowledgement signal. In one case, if the second user having the second handheld device 104 rejects the traffic stop notification, the first user (law enforcement officer) may act according to a standard operating procedure of the law enforcement. It can be noted that rejecting the traffic stop notification means that the second user is not willing to authenticate credentials of either the owner or the one or more authorized drivers of the vehicle 108 or the one or more connected passengers 110. It can also be noted that the standard operating procedure may be penalizing the first user or may be giving a benefit of doubt.

In another case, if the second user accepts the traffic stop notification, the first user may also act according to the standard operating procedure of the law enforcement. The first user may demand driving permit or vehicle insurance or vehicle registration documents from an authorized driver of the one or more authorized drivers and the owner of the vehicle 108. Further, the first user may also demand identification of the one or more connected passengers 110 of the vehicle.

In one embodiment, based on the generated traffic stop notification, the second user associated with the second handheld device 104 may approve or deny stopping the vehicle. In one case, the second user may not stop the vehicle, a message may be sent to the first handheld device 102. Upon denying by the second user, the informatory device 106 starts emitting solid red light. In another embodiment, the traffic stop notification may be denied due to technical issue in the informatory device 106 in that case the first handheld device 102 may generate another traffic stop notification automatically. If another traffic stop notification is also denied, then the first user (police officer) may proceed with caution and follow their department policy for routine stop. In another case, the second user may approve or accept the traffic stop notification generated. In one embodiment, the second user may keep both hands on the second handheld device 104, atop the steering wheel of the vehicle. Such use of second handheld device 104, may put the first user's mind at ease, as the second user would not be seen reaching around inside a pocket, a purse, a glove compartment, or center console of the vehicle for retrieving documents related to vehicular information.

At step 408, the vehicular information of the second user and the badge information of the first user may be exchanged between the first handheld device 102 and the second handheld device 104 respectively. In one embodiment, the first user may share his/her official credentials with the second user to authenticate the validity of the law enforcement officer. In another embodiment, the second user may share the driver's permit and insurance associated with the vehicle which he/she is driving. The first user may then check validity of the driver's permit and the insurance of the vehicle. In one case, if the credentials shared by the first user are not valid, the second user may report directly to the law enforcement agency or department. In this case, the second user does not need to share credentials to the first user. In another case, if the credentials shared by the second user are not valid, the first user may charge penalty to the first user, according to the standing procedure provided by the law enforcement agency or department.

In one exemplary embodiment, the first user requests to authenticate the insurance of the vehicle. In one alternate embodiment, the request may be generated automatically. Further, the request may be generated when the first handheld device 102 is within a predefined distance from the vehicle or the informatory device 106. In one example embodiment, the request is generated when the first handheld device 102 is within 5 meters from the informatory device 106.

In one alternate embodiment, the lightning device 218 may be triggered to indicate the acknowledgement of the request generated by the first user. The second handheld device 104 sends a signal to the informatory device 106, mounted on the vehicle. In one embodiment, the transceiver 212 of the informatory device 106 may receive the signal. Further, the controller 214, in communication with the transceiver 212 and the lightning device 218, may trigger the lightning device 218. As a result of the trigger, the lightning device 218 may start blinking. In one embodiment, the lightning device 218 may blink in a pre-defined manner. In another embodiment, the lightning device 218 may blink to signify a particular compliance pattern. In one exemplary embodiment, the lightning device 218 may flicker continuously, when the second user acknowledges to share full information, based on the request. In another exemplary embodiment, the lightning device 218 may flicker with pauses, when the second user acknowledges partial information, based on the request. It can be noted that the blinking of the lightning device 218 of the informatory device 106 may indicate the acknowledgement and compliance of the second user, with the request generated by the first user.

In an alternate embodiment, upon generating the traffic stop notification by the first user, the lightning device 218 flickers white light to acknowledge the first user that the second user is willing to accept the request. After accepting the request by the second user, the lightning device 218 emits solid white light to confirm the first user about the request is accepted by the second user. If the user denies the request, then the lightning device 218 blinks a red light.

In another embodiment, the informatory device 106 may spell out or flash the word PEACE. In another embodiment, the informatory device 106 may produce a sound upon, receiving the acknowledgement signal from the second handheld device 104.

In one embodiment, the signal may correspond to the vehicular information, as requested by the first user. In one embodiment, the vehicular information is the information related to documentation of the vehicle, information about person driving the vehicle at the time of stop and information of fellow passengers in the vehicle. In one embodiment, the second handheld device 104 may directly transmit the vehicular information to the first handheld device 102. The second user associated with the second handheld device 104 may use the PEACE device application to transmit the vehicular information to the first handheld device 102. In another embodiment, the second handheld device 104 may firstly transmit the vehicular information to the informatory device 106. Then, the informatory device 106 may transmit the vehicular information to the first handheld device 102. It can be noted that the first handheld device 102, the second handheld device 104, and the informatory device 106 may communicate using at least one of a Radio-Frequency Identification (RFID), cellular network, Wi-Fi, Bluetooth, or ZigBee. In one embodiment, the informatory device 106 may comprise a global positioning system (GPS) and may be used to send the vehicular information voluntarily to nearby police stations, by using the GPS.

In one embodiment, the second handheld device 104 may blast or broadcast the vehicular information, to all nearby law enforcement or police stations. In another embodiment, the second handheld device 104 may share the vehicular information with a particular police officer based on the credentials of the police officer. In another embodiment, the second handheld device 104 may share the vehicular information with nearby police officers, nearby police stations and also to the various contacts saved in the second handheld device 104. In another embodiment, the second user and other occupants in the vehicle may communicate with all the nearby law enforcement personnel or police stations by using the PEACE application installed in the second handheld device 104 and all the law enforcement personnel and police stations may communicate to each other by using the PEACE application installed in the first handheld devices. Further, the PEACE device application may cause the vehicular information shared to be automatically destroyed, after a pre-defined event. In an embodiment, the lightning device 218 may emit solid white light upon broadcasting the vehicle information. In one exemplary embodiment, the pre-defined event may be a pre-defined time or a user action via the PEACE device application. The use of the PEACE device application may facilitate sharing of contemporaneous dynamic vehicular information, such as the information related to the driver of the vehicle. In one embodiment, the driver of the vehicle may provide authorization from an owner of the vehicle, for driving the vehicle, to the informatory device 106.

Thereafter, the first user may verify or authenticate the vehicular information manually. Further, the first user may share, via the PEACE device application installed on the first handheld device 102, the vehicular information with a predefined law enforcement office or a police station, based on the credentials of the first user. In one embodiment, the first user may verify or authenticate the vehicular information by cross-checking the information with databases associated with the network. Further, the database may include National Law Enforcement Telecommunications System (NLETS), National Crime Information Center (NCIC), DMV database, Interstate Identification Index (III). In another embodiment, the first user may use Artificial Intelligence (AI) technology to authenticate vehicular information.

In an embodiment, if the first user gives a warning or put a penalty on the second user because of number of situations including speeding, driver running traffic lights or any other traffic violation, then this event may be stored in a memory unit of the informatory device 106 with specific time frame.

In one embodiment, such use of the informatory device 106 may promote a friendly approach and provide a positive police environment and civilian interactions. Further, the informatory device 106 may facilitate time saving and compliance with social distancing. Further, the use of the informatory device 106 may minimize interaction between the first user and the second user, thus reducing stress and anxiety for both the first user and the second user. Further, minimized interaction may reduce the potential for an altercation or even a tragic incident. In one embodiment, minimized interaction may reduce the potential for a confrontation, misunderstanding, arrest, or possibly even having the second user shot and killed in what should be a routine stop.

Figure 5A:
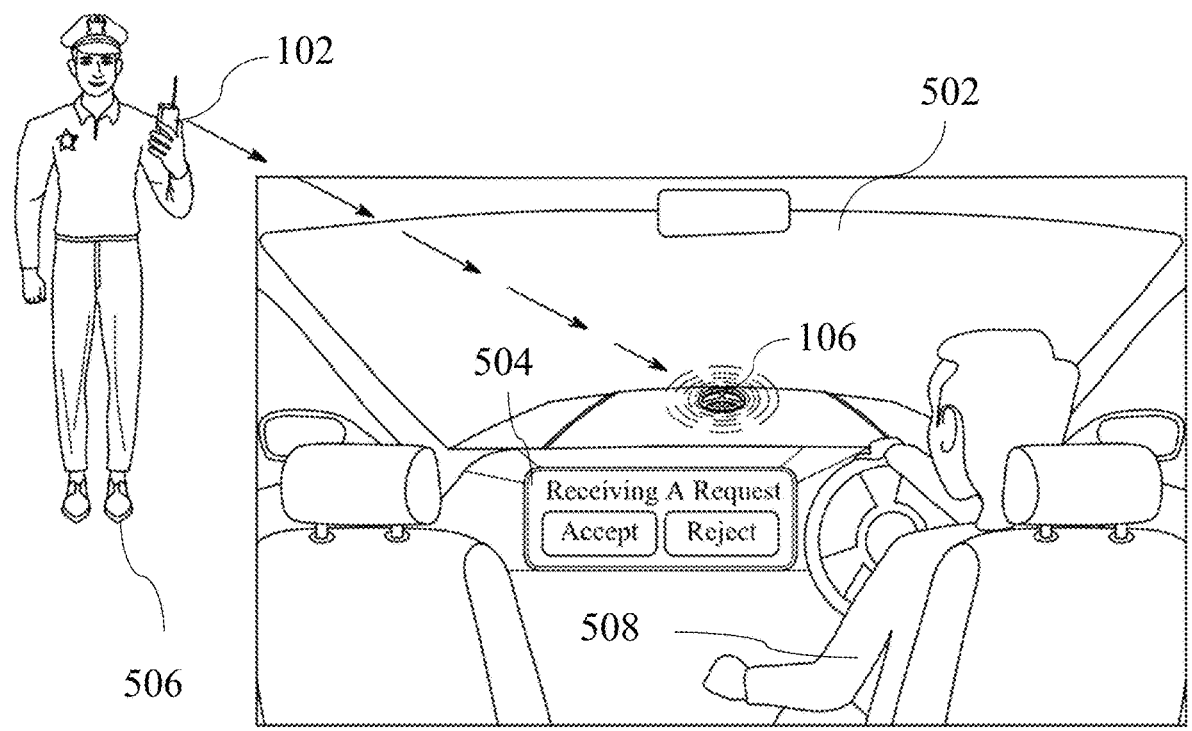
FIG. 5A illustrates a use case scenario about the request generated by a policeman, according to an embodiment.

FIG. 5A illustrates a use case scenario about the request generated by a first user (policeman), according to an embodiment. FIG. 5A discloses the aspect of a vehicle 502 travelling on a road. The vehicle 502 comprises a display screen 504 and the informatory device 106. Further, the vehicle 502 is approaching a policeman 506. The first user 502 generates a request inquire about the vehicle 502. In one embodiment, the policeman 506 may generate the request through the PEACE device application installed on the mobile phone 102 of the policeman 506. In one embodiment, the request may be generated when the policeman 506 stops the vehicle 502 for a routine check on vehicular information or a suspicious check on the vehicular information. Further, the request may be generated when the mobile phone 102 is within a predefined distance from the vehicle 502 or the informatory device 106. In one example embodiment, the request is generated when the mobile phone 102 is within 5 meters from the informatory device 106. Further, a driver 508 is driving the vehicle 502. In one case, the driver 508 accepts the request made by the policeman 502. Further the informatory device 106 starts flickering white light to notify the policeman 506 that the driver 508 is compliant with the request raised by the policeman 506. Further a message of request received is also displayed on the display screen 504 of the vehicle 502 and the driver 508 is displayed with options to accept or reject the request on the display screen 504.

Figure 5B:
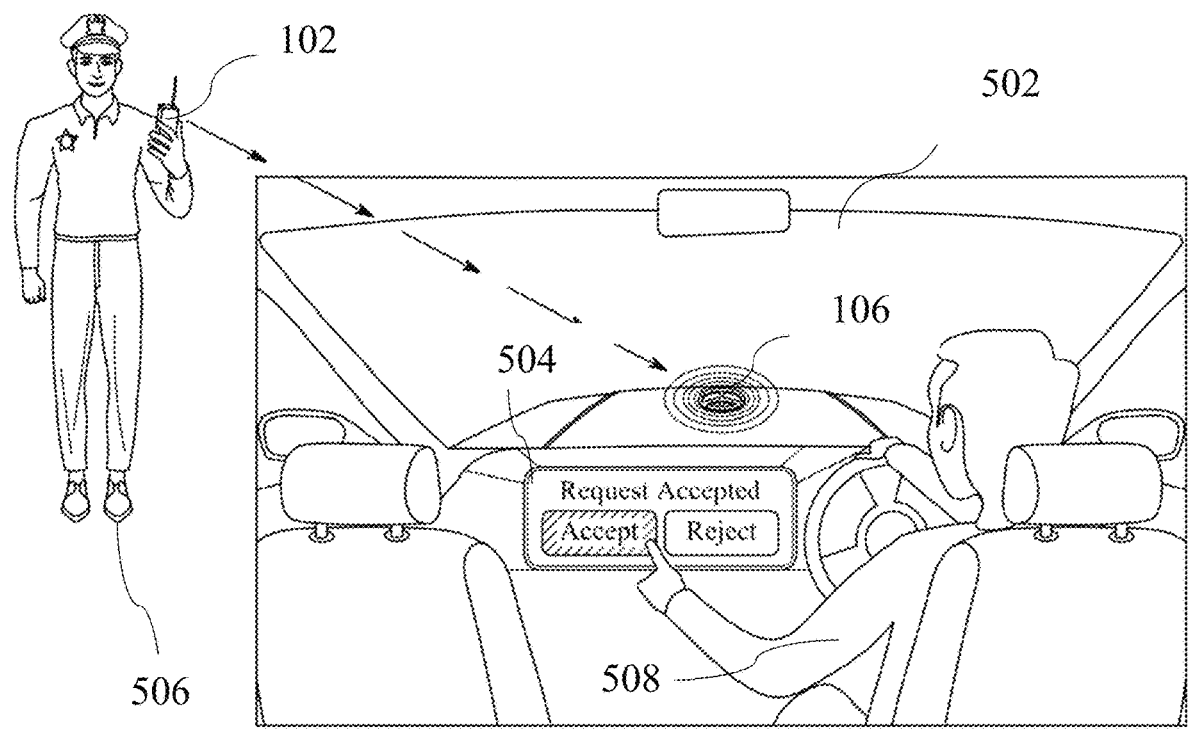
FIG. 5B illustrates another use case scenario about the acceptance of the request generated by the policeman in FIG. 5A, by a driver, according to an embodiment.

FIG. 5B illustrates a use case scenario about the accepting of the request by the driver 508, according to one embodiment. The driver 508 may accept the request via the display screen 504, as shown in FIG. 5B. Further, after accepting the request on the display screen 504, the driver 508 may keep both hands atop the steering wheel of the vehicle 502. Such use of informatory device 106 may put the policeman 506 at ease, as the driver 508 would not be seen reaching around inside a pocket, a purse, a glove compartment, or center console of the vehicle 502 for retrieving documents related to vehicular information. After accepting the request by the driver 508, the informatory device 106 on the vehicle 502 starts emitting solid white light and a message of request accepted is displayed on the display screen 504 of the vehicle 502.

Figure 5C:
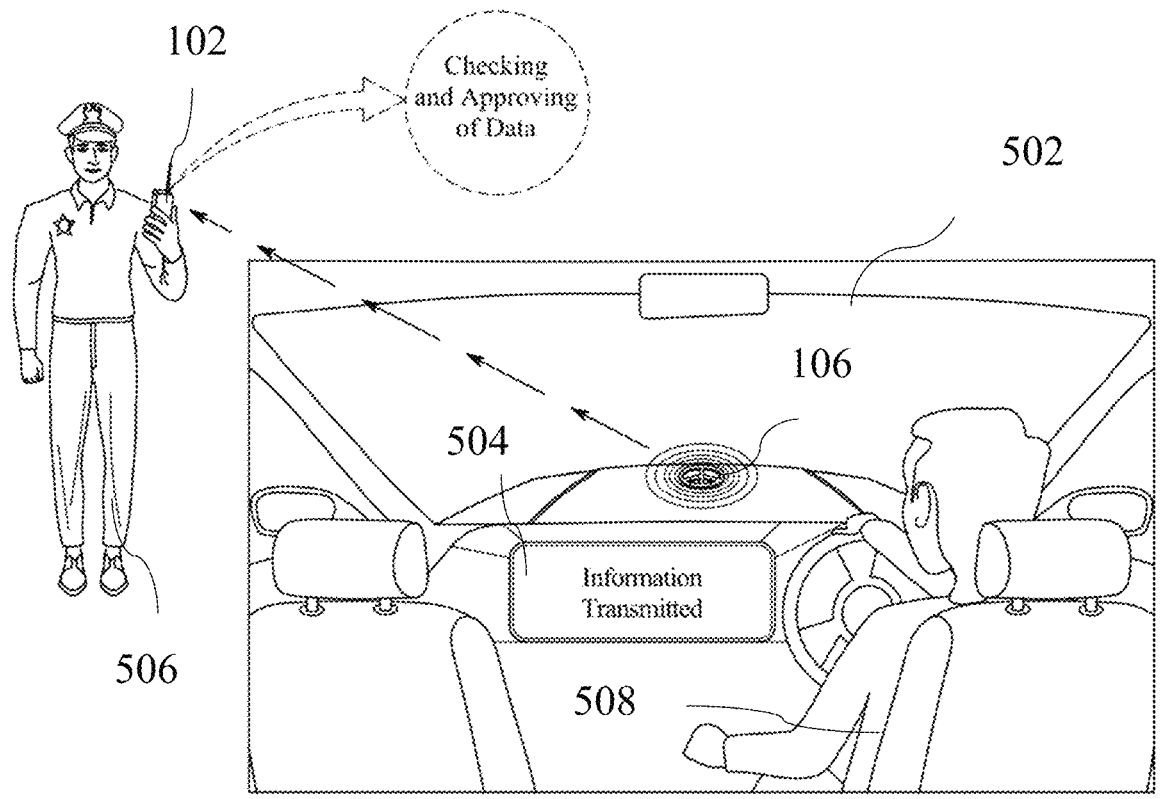
FIG. 5C illustrates another use case scenario about the vehicular and occupant information transmission by the driver, to the policeman, after the acceptance of the request in FIG. 5B, according to an embodiment.

FIG. 5C illustrates a use case scenario about the vehicular and occupant information transmission by the driver. FIG. 5C discloses about the aspect of transmitting vehicular and occupant information to the policeman 506, by the informatory device 106. In one embodiment, the vehicle information may be transmitted to the mobile phone 102 of the policeman 506, via the PEACE device application. Further, the vehicle information may be transmitted from the informatory device 106, mounted on the vehicle 502. Further a message indicating information transmitted may be displayed on the display screen 504 of the vehicle 502. Further, the policeman 506 may check or validate the received vehicular information. In one case, if the policeman 506 finds an occurrence of an event like any violation of the traffic rules or discrepancy with the received vehicular information, the policeman 506 may charge a penalty on the driver 508. Further, the event may be saved in the informatory device 106. In one embodiment, the event may be saved along with a timestamp, for future reference.

Figure 6A:
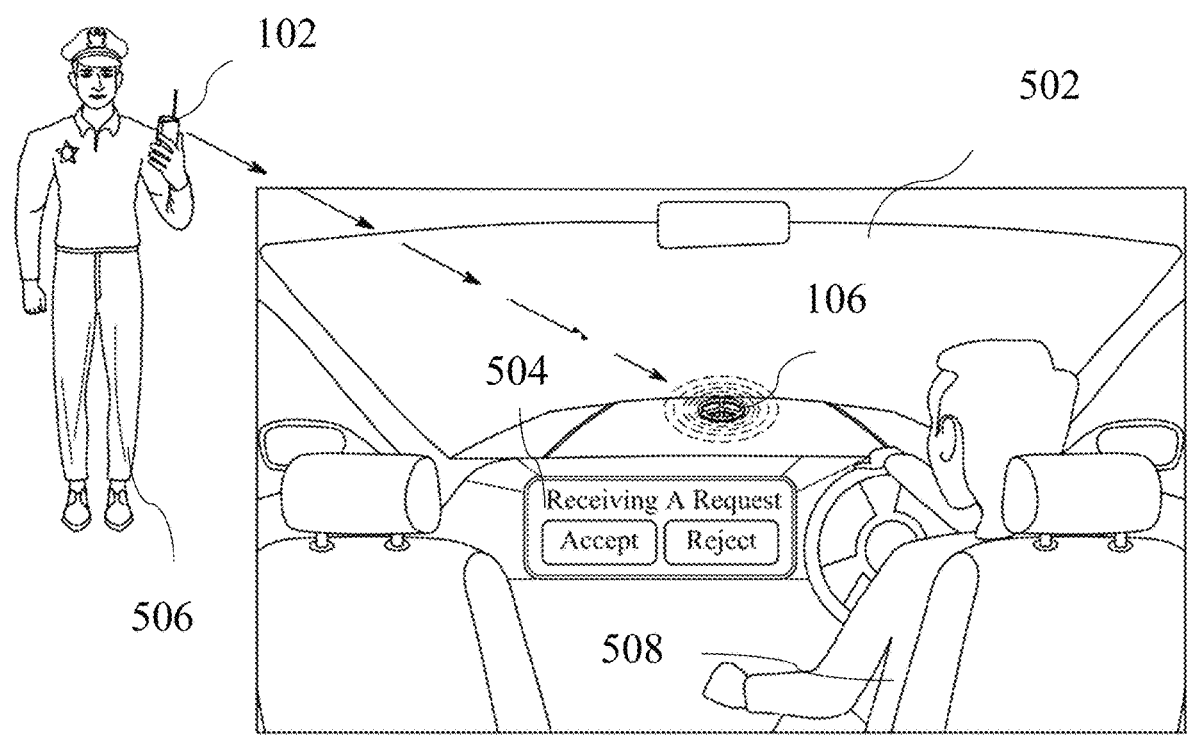
FIG. 6A illustrates a use case scenario about the request received by the driver, according to an embodiment.

FIG. 6A illustrates a use case scenario about the request received by the driver 508. Further, the policeman 506 may generate the request through the PEACE device application. In one embodiment, the request may be generated when the policeman 506 stops the vehicle 502 for a routine check on vehicular information or a suspicious check on the vehicular information. Further, the request may be generated when the mobile phone 102 is within a predefined distance from the vehicle 502 or the informatory device 106. In one example embodiment, the request is generated when the mobile phone 102 is within 5 meters from the informatory device 106. Further, the informatory device 106 on the vehicle 502 starts flickering white light to insure the policeman 506 that the driver 508 is willing to accept the request. Further, a message related to the request received is also displayed on the display screen 504 of the vehicle 502 and the driver 508 has a choice to accept or reject the request.

Figure 6B:
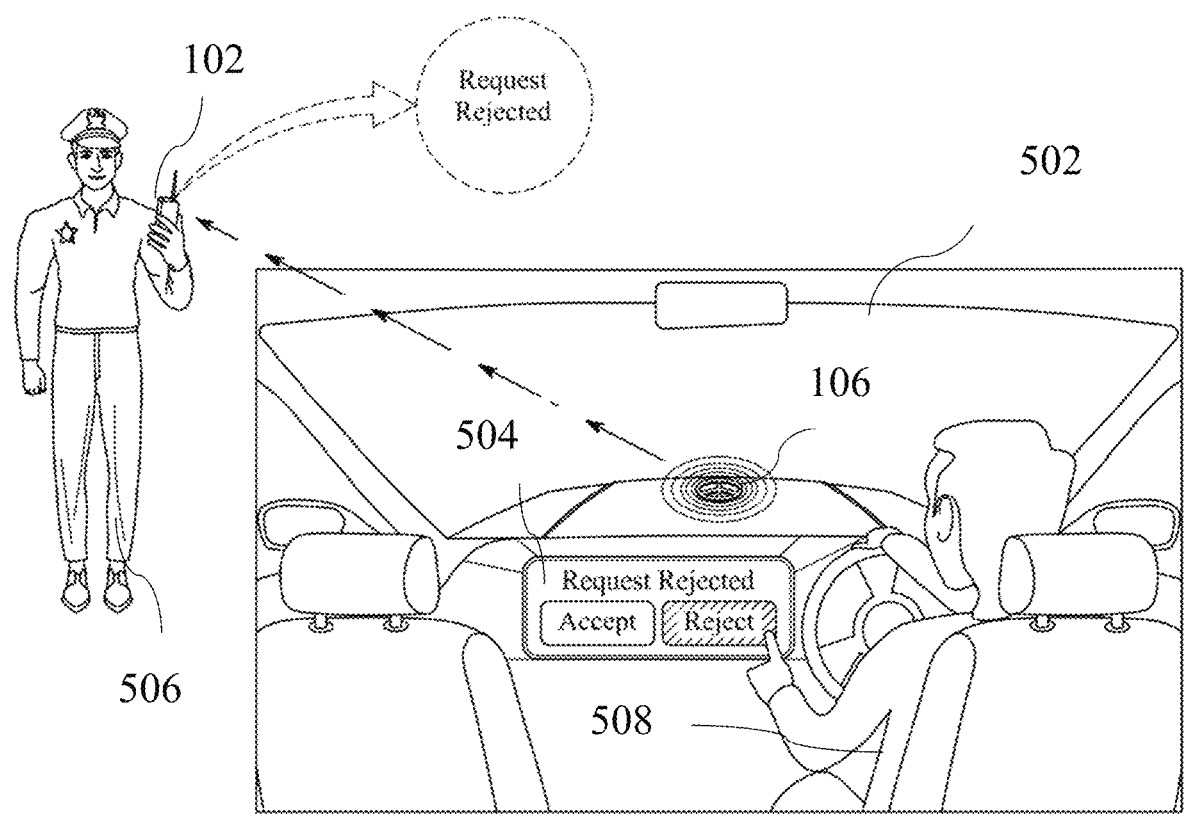
FIG. 6B illustrates another use case scenario about the request denied by the driver, generated by the policeman in FIG. 6A, according to an embodiment.

FIG. 6B illustrates a use case scenario which discloses the aspect of rejecting the request of policeman 506, by the driver 508. In one case, the driver 508 may reject the request raised by the policeman 506. The driver 508 may reject the request, via the display screen 504. When the driver 508 rejects the request raised by the policeman 506, a message of rejecting request is displayed on the display screen 504 of the vehicle 502. Further, the informatory device 106 emits solid red light to show that the driver 508 is not willing to share the vehicle information and the message of request rejected is also displayed to the policeman 506. In this situation, the policeman 506 may proceed with caution and follow their department policy for routine stop.

Figure 7:
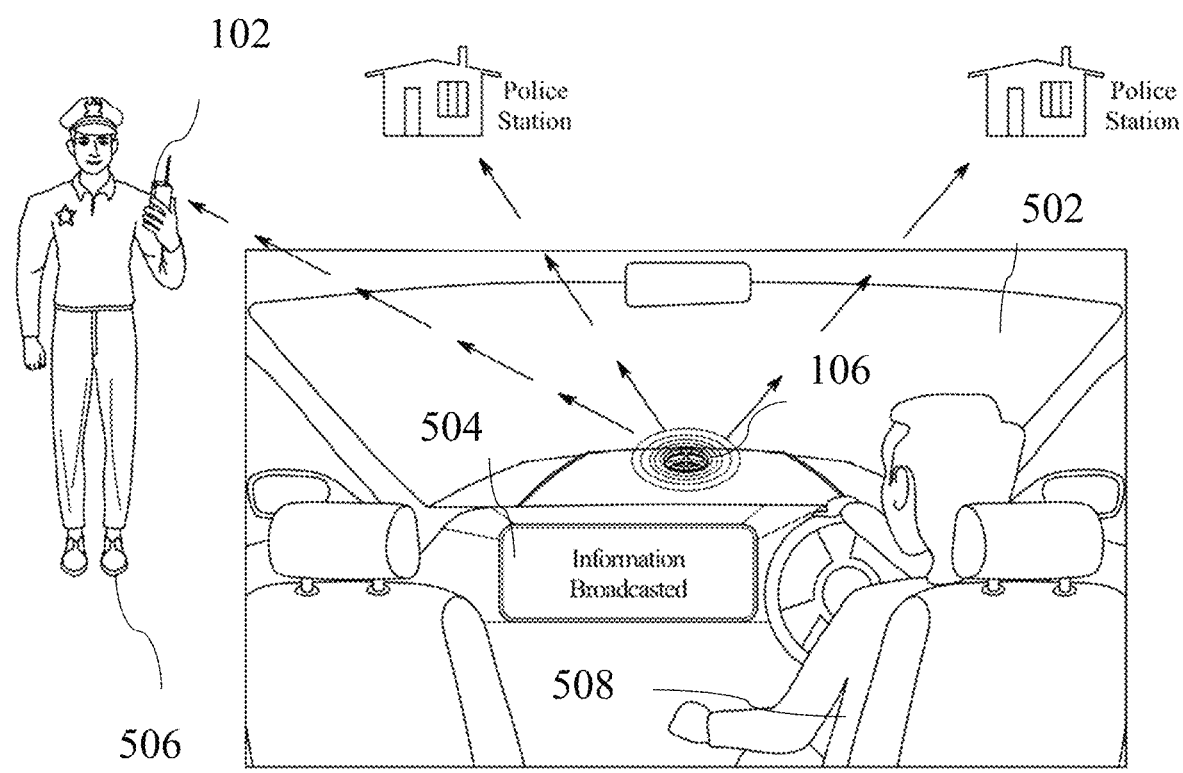
FIG. 7 illustrates a use case scenario about broadcasting of the vehicle information by the driver, according to an embodiment.

FIG. 7 illustrates a use case scenario about broadcasting of the vehicle information by the driver 508. Further, the driver 508 may share the vehicular information with a particular policeman based on the credentials of the policeman. In another embodiment, the driver 508 may share the vehicular information with nearby police officers, nearby police stations. Further, the PEACE device application may cause the vehicular information shared to be automatically destroyed, after a pre-defined event. In one exemplary embodiment, the pre-defined event may be a pre-defined time or a user action via the PEACE device application. The use of the broadcasting the vehicle information may facilitate sharing of contemporaneous dynamic vehicular information, such as the information related to the driver of the vehicle 502. In one embodiment, a driver of the vehicle 502 may provide authorization from an owner of the vehicle 502, for driving the vehicle 502, to the informatory device 106. Further, a message of information broadcasted is displayed on the display screen 504 of the vehicle 502. Further the informatory device 106 emits solid white light upon the information is broadcasted by the driver 508.

Figure 8:
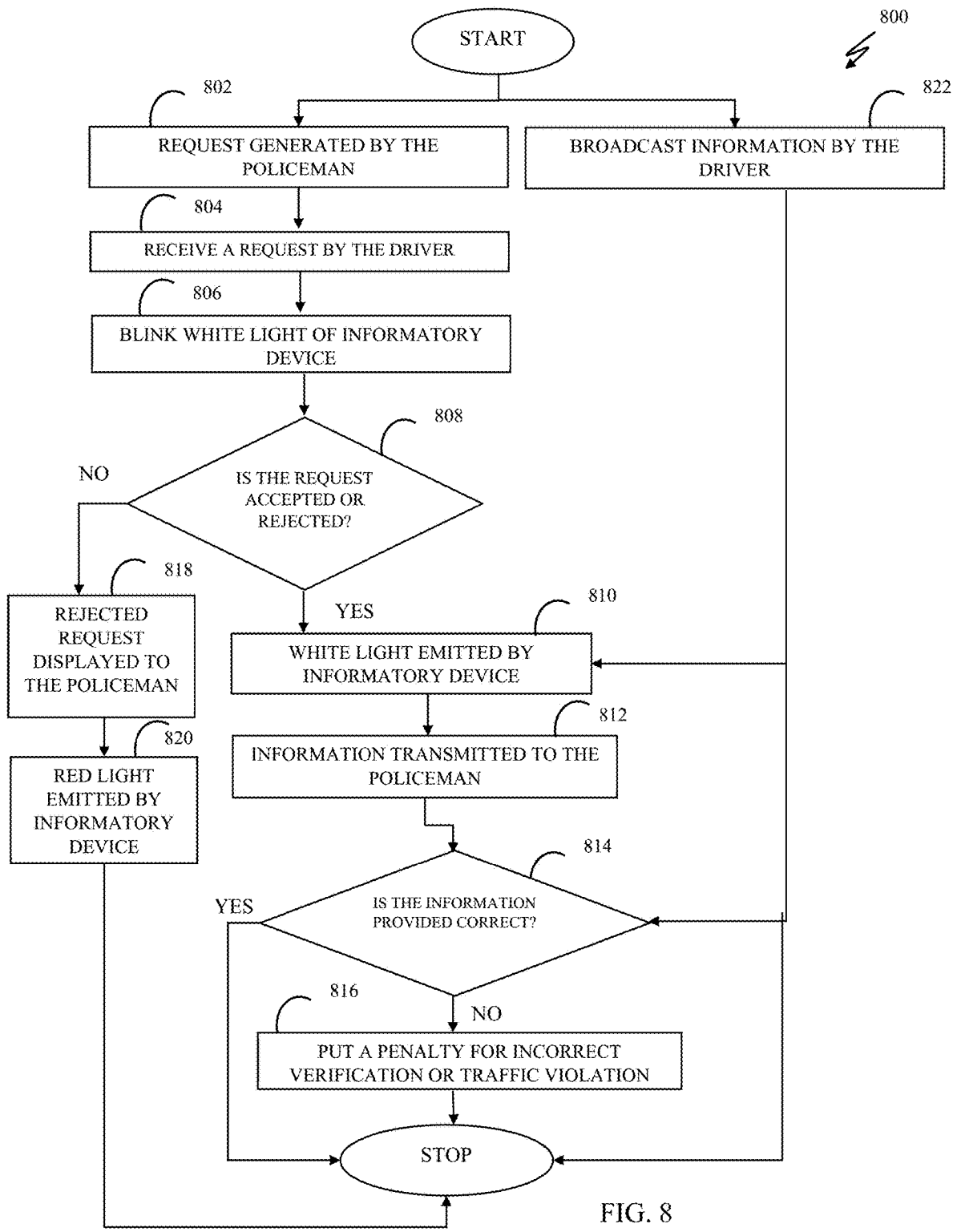
FIG. 8 illustrates a flowchart 800 showing steps of the use case scenario, according to an embodiment.

FIG. 8 illustrates a flowchart 800 disclosing about the steps of the use case scenario. It should also be noted that in some alternative implementations, the functions noted in the blocks may occur out of the order noted in the drawings. For example, two blocks are shown in succession in FIG. 8 may be executed substantially concurrently or the blocks may sometimes be executed in the reverse order, depending upon the functionality involved. In addition, the process descriptions or blocks in flow charts should be understood as representing decisions made by a hardware structure such as a state machine. The flowchart 800 starts at step 802 and proceeds to step 822.

The flowchart comprises, at first, request generated by the policeman 506, at step 802. The policeman 506 generates the request to inquire about the upcoming vehicle 502. Further, the driver 508 receives the request, at step 804. After generating the request by the policeman 506, a message of receiving a request is displayed on a display screen 504 of the vehicle 502. Further, based on compliance by the driver 508, a white light of informatory device blinks, at step 806. After receiving the request by the driver 508, the informatory device 106 starts blinking white light to acknowledge the policeman 506 that the driver 508 has received the request and he is willing to accept the request. Further, it is determined whether the request is accepted or rejected, at step 808. After receiving the request, the driver 508 has the choice to accept the request or reject the request. In one case, if the driver 508 accepts the request than the vehicle information is transmitted to the policeman 506 through the informatory device 106 and a message of information transmitted is displayed on the display screen 504 of the vehicle 502. Further, white light emitted by the informatory device, at step 810. Further, the vehicular and occupant information is transmitted to the policeman 506, at step 812. After accepting the request by the driver 508, the informatory device 106 emits solid white light to show that the driver 508 has accepted the request generated by the policeman 506. Further, information may be verified by the policeman 506, at step 814. After receiving the information of the vehicle 502, the policeman 506 authenticates the information to complete inquiry of the vehicle 502. In one case, if the information is incorrect, a penalty for incorrect verification or traffic violation is put for the driver 508 or the occupant, at step 816. If the driver 508 provides incorrect/partial information of the vehicle or violate any of the traffic rules than the policeman 506 may impose penalty on the driver 508. In another case, if the information is correct, then process ends.

In one embodiment, when at step 808, the request is rejected by the driver 508, the rejection of the request is displayed to policeman 506, at step 818. In one case, if the driver 508 rejects the request than the policeman 506 receive a message of request rejected and the message of rejecting request is also displayed on the display screen 504 of the vehicle 502. Further, a red light is emitted by vehicular informatory device, at step 820. Upon rejecting the request by the driver 508, the informatory device 106 emits solid red light to show that the driver 508 has rejected the request generated by the policeman 506. In addition, the policeman 506 may proceed with caution and follow department policy for routine stop.

In one embodiment, the vehicular information is broadcasted by the driver 508, at step 822. Further, a message of information broadcasted is displayed on the display screen 504 of the vehicle 502. This is a different scenario in which the driver 508 itself transmits the vehicle information to the policeman 506 by using broadcast. Further, the vehicle information may be transmitted to the nearby police stations, and also to the saved contacts of the driver 508.

Figure 9:
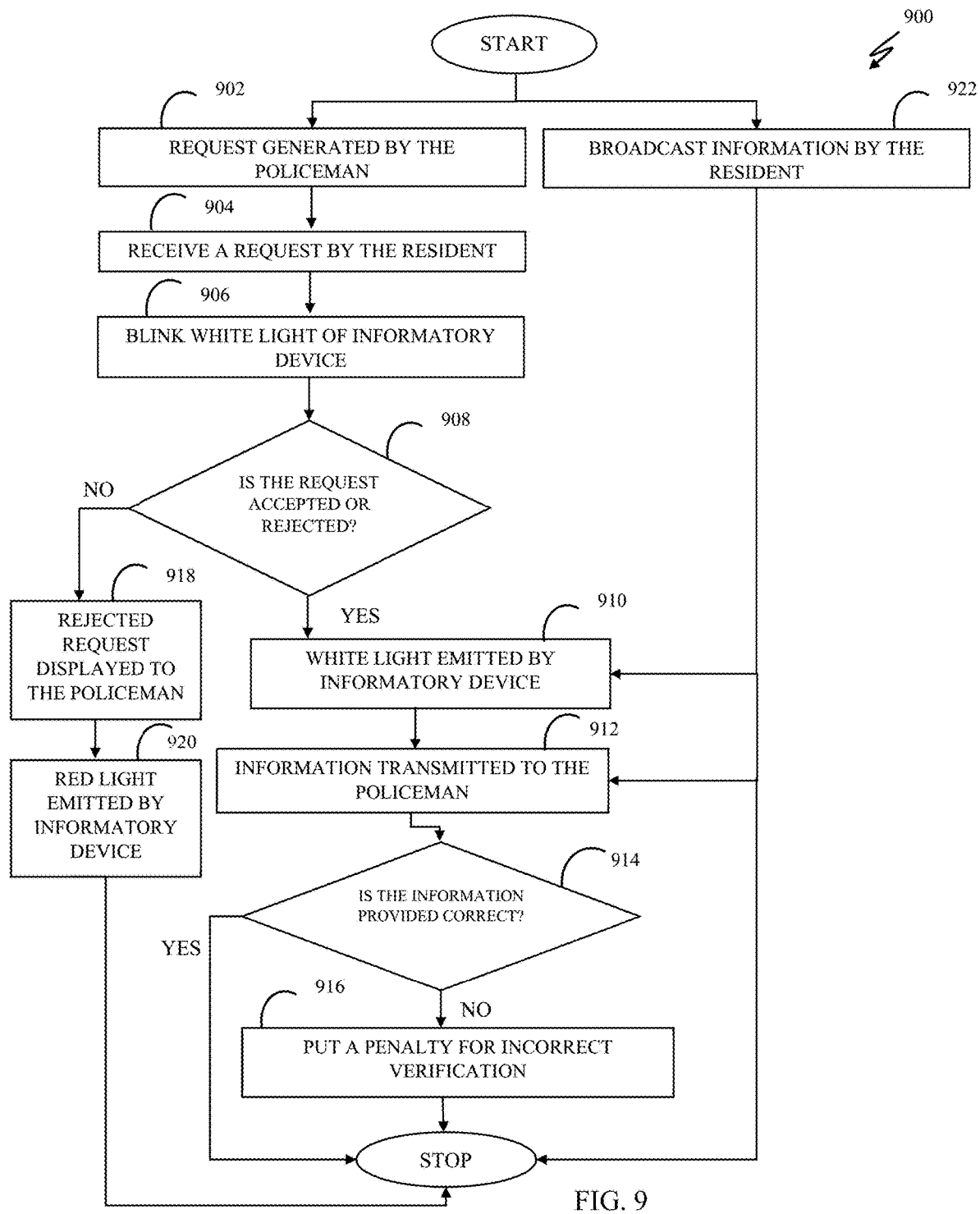
FIG. 9 illustrates a general flowchart 900 for disclosing the method with respect to authentication of a resident's information of a property, according to an embodiment.

FIG. 9 illustrates a flowchart 900 disclosing about the steps of inquiry at a residential property. It should also be noted that in some alternative implementations, the functions noted in the blocks may occur out of the order noted in the drawings. For example, two blocks are shown in succession in FIG. 9 may be executed substantially concurrently or the blocks may sometimes be executed in the reverse order, depending upon the functionality involved. In addition, the process descriptions or blocks in flow charts should be understood as representing decisions made by a hardware structure such as a state machine. The flowchart 900 starts at step 902 and proceeds to step 922.

The flowchart comprises, at first, request generated by the policeman 506, at step 902. The policeman 506 generates the request to inquire about the residential property. Further, the resident receives the request, at step 904. After generating the request by the policeman 506, a message of receiving a request is displayed on a mobile phone of the resident. Further, based on compliance by the resident, a white light of informatory device blinks, at step 906. After receiving the request by the resident, the informatory device 106 starts blinking white light to acknowledge the policeman 506 that the resident has received the request and he is willing to accept the request. Further, it is determined whether the request is accepted or rejected, at step 908. After receiving the request, the resident has the choice to accept the request or reject the request. In one case, if the resident accepts the request than the resident's information is transmitted to the policeman 506 through the informatory device 106 and a message of information transmitted is displayed on the mobile phone of the resident. Further, white light emitted by the informatory device, at step 910. Further, the resident's information is transmitted to the policeman 506, at step 912. After accepting the request by the resident, the informatory device 106 emits solid white light to show that the driver 508 has accepted the request generated by the policeman 506. Further, information may be verified by the policeman 506, at step 914. After receiving the information of the resident, the policeman 506 authenticates the information to complete inquiry of the residential property. In one case, if the information is incorrect, a penalty for incorrect verification is put on the resident, at step 916. If the resident provides incorrect/partial information of the property than the policeman 506 may impose penalty on the resident. In another case, if the information is correct, then process ends.

In one embodiment, when at step 908, the request is rejected by the resident, the rejection of the request is displayed to policeman 506, at step 918. In one case, if the resident rejects the request than the policeman 506 receive a message of request rejected and the message of rejecting request is also displayed on the mobile phone of the resident. Further, a red light is emitted by the informatory device, at step 920. Upon rejecting the request by the resident, the informatory device 106 emits solid red light to show that the resident has rejected the request generated by the policeman 506. In addition, the policeman 506 may proceed with caution and follow department policy for routine check.

In one embodiment, the vehicular information is broadcasted by the resident, at step 922. Further, a message of information broadcasted is displayed on the mobile phone of the resident. This is a different scenario in which the resident itself transmits the information of the residential property to the policeman 506 by using broadcast. Further, the information of the residential property may be transmitted to the nearby police stations.

Thus, the system 100 and method may assist the second user in presenting the personnel identification and the information of the belonging vehicle or property easily at the time of inquiry. It will be apparent to one skilled in the art that the above-mentioned components of the informatory device 106 have been provided only for illustration purposes. It will be apparent to one skilled in the art that the above-mentioned components of the device and method have been provided only for illustration purposes.

Figure 10:
FIG. 10 illustrates a graphical user interface (GUI) for logging into a Police Enforcement and Civilian Encounters (PEACE) device application, according to another embodiment.

FIG. 10 illustrates a graphical user interface (GUI) 1000 for logging into a Police Enforcement and Civilian Encounters (PEACE) device application, according to another embodiment.

At first, a user is prompted with a home screen to log into the PEACE device application using his/her email address and password. The PEACE device application searches for the entered credentials from a PEACE device application database. In one case, if the credentials entered by the user are not correct. The home screen pops, "No account for the entered email address". Further, the home screen prompts to signup for the PEACE device application if the user does not have an account. In this case, the user is requested to enter primary information, such as, name, email address, and driver's permit. In another case, if the credentials entered by the user are correct, then the home screen may reflect next page for terms and conditions of the PEACE device application, as shown in FIG. 11.

Figure 11:
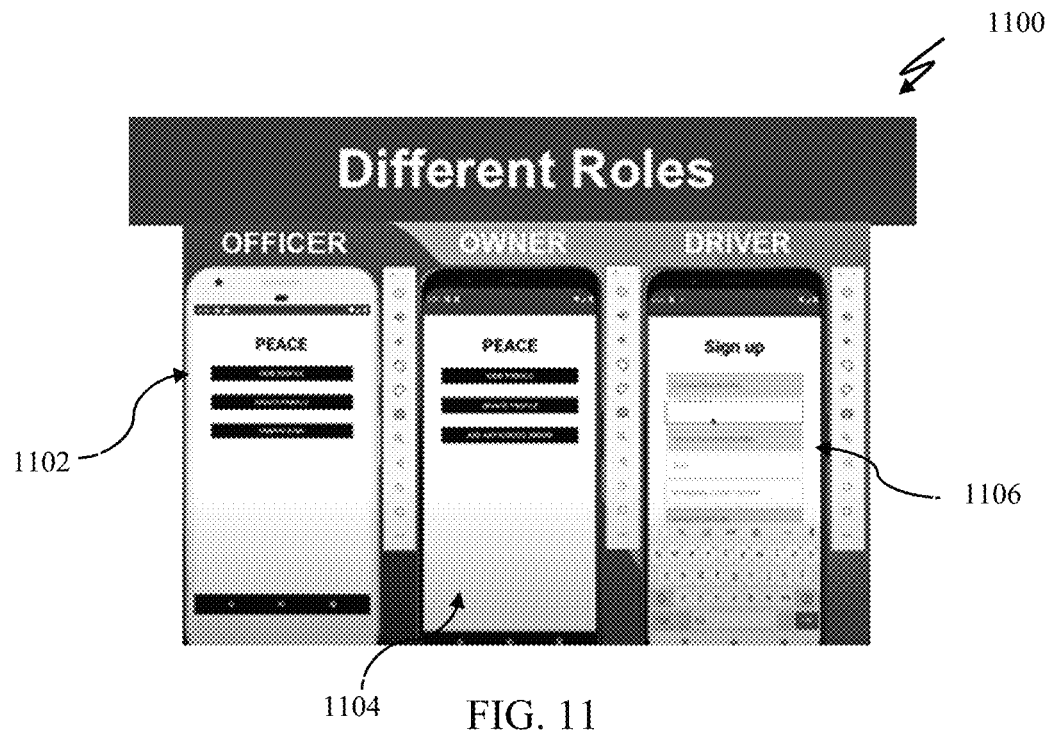
FIG. 11 illustrates another GUI for different roles provided by the application upon login/signup, according to another embodiment.

FIG. 11 illustrates another GUI 1100 for different roles provided by the application upon login/signup, according to another embodiment. The user must choose among different roles which will be stored in the PEACE device application database. The PEACE device application provides at least three different roles for the user. In one embodiment, the PEACE device application offers three roles as, officer 1102, owner 1104, and driver 1106. The user must enter his/her credentials. For example, Alan of New York Police Department choses officer by entering his police badge number, Nelson of New York has a car and choses owner by entering car insurance, driver's permit. Further, the PEACE device application gives the owner 1104 to add or remove the one or more authorized drivers. In one example, Nelson adds his son named Alex as an authorized driver of the car by entering Alex's driver's permit. It can be noted that the added authorized driver cannot edit the credentials entered by the owner. It can also be noted that the added authorized driver cannot add or remove further authorized drivers into the PEACE device application. Further, the credentials entered by the user (officer 1102 and owner 1104) may be helpful while exchanging of information, as shown in FIG. 12.

FIG. 12 illustrates another GUI 1200 for initiating a traffic stop by a law enforcement officer, according to another embodiment. At first, the traffic stop notification is initiated by the law enforcement officer using a "Traffic Stop" button on the PEACE device application. Further, the law enforcement officer searches for the vehicle by plate number associated with the vehicle. The owner 1104 or the driver 1106 or the one or more connected passengers 110 receives the acknowledgement signal from the PEACE device application.

Figure 13:
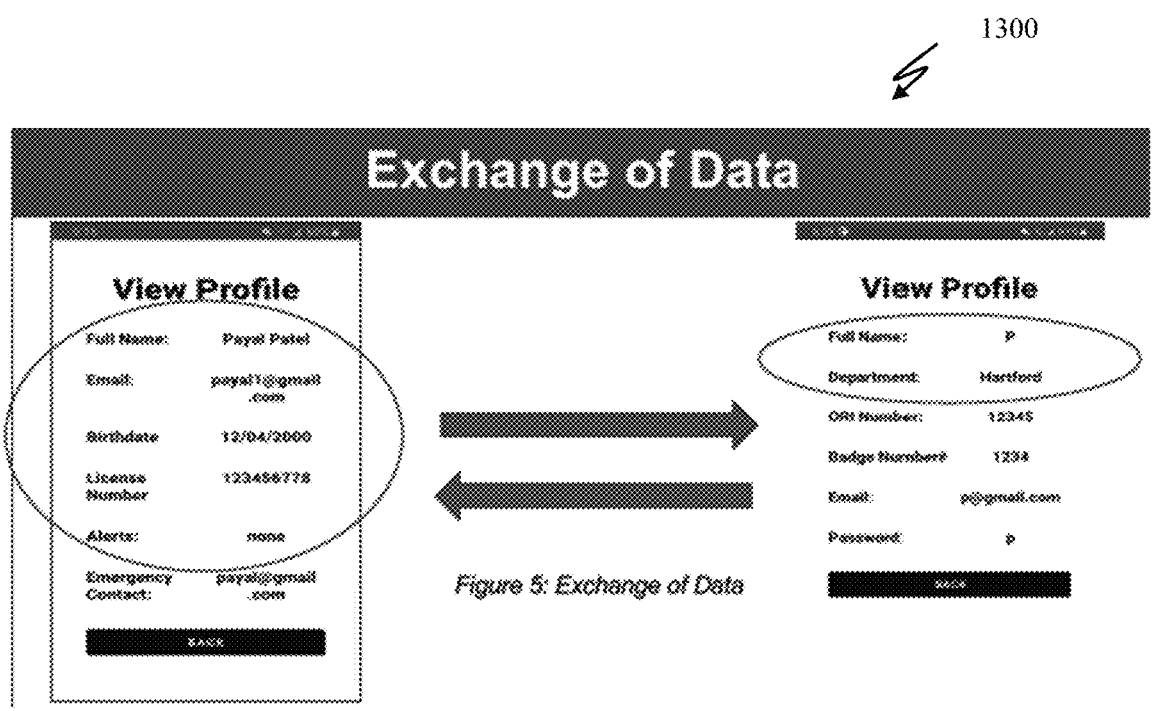
FIG. 13 illustrates another GUI for exchange of data between different roles, according to another embodiment.

Successively, the owner 1104 or the driver 1106 or the one or more connected passengers 110 responds to the traffic stop notification by accepting or rejecting the request to exchange credentials between the officer 1102 and the he owner 1104 or the driver 1106 or the one or more connected passengers 110. In one embodiment, the officer 1102 may be proximity with the he owner 1104 or the driver 1106 or the one or more connected passengers 110 associated with the vehicle. Further, the exchange of information/credentials occur between the owner 1104 or the driver 1106 or the one or more connected passengers 110, as shown in another GUI 1300 of FIG. 13.

While the preferred embodiment of the invention has been illustrated and described, as noted above, many changes can be made without departing from the spirit and scope of the invention. For example, aspects of the present invention may be adopted on alternative operating systems. Accordingly, the scope of the invention is not limited by the disclosure of the preferred embodiment. Instead, the invention should be determined entirely by reference to the claims that follow.

LIST OF ELEMENTS

A System and a Method for Authenticating Information During a Police Inquiry

100 System
102 First handheld device
104 Second handheld device
106 Vehicular informatory device
202 First side of the Vehicular informatory device
204 Second side of the Vehicular informatory device
206 Magnetic body
208 Plastic body
210 Circuitry
212 Transceiver
214 Controller
216 Memory
218 Lightning device
300 Vehicle system
302 Vehicle
400 Flowchart
402 Step
404 Step
406 Step
408 Step 502 Vehicle
504 display screen
506 first user
508 second user
800 Flowchart
802 Step
804 Step
806 Step
808 Step
810 Step
812 Step
814 Step
816 Step
818 Step
820 Step
822 Step
900 Flowchart
902 Step
904 Step
906 Step
908 Step
910 Step
912 Step
914 Step
916 Step
918 Step
920 Step
922 Step
1000 Graphical User Interface
1100 Another GUI
1102 Officer
1104 Owner
1106 Driver
1200 Another GUI
1300 Another GUI

What is claimed is:

1. A system for authenticating information of a vehicle and automobilist, the system comprising:
a first handheld device, associated with a first user, configured to generate a request for authenticating the vehicular information of the vehicle;
a second handheld device, associated with a second user, configured to acknowledge the request; and
a vehicular informatory device mounted on the vehicle and configured to communicate with the first handheld device and the second handheld device, wherein the vehicular informatory device comprises:
a magnetic body coupled at a first side of the vehicular informatory device to mount the vehicular informatory device on the vehicle;
a plastic body coupled to the magnetic body, at a second side of the vehicular informatory device; and
a circuitry housed in the plastic body, wherein the circuitry facilitates communication among the first handheld device, the second handheld device, and the vehicular informatory device, for authenticating the vehicular information and automobilist of the vehicle, and wherein the circuitry comprises:
a transceiver housed in the plastic body, and configured to receive an acknowledgement signal from the second handheld device upon accepting the request for sharing vehicular information by the second user; and
a controller coupled to the transceiver and configured to trigger a lightning device upon receiving the acknowledgement signal from the transceiver.

2. The system of claim 1, wherein the transceiver is configured to:
transmit a signal, to the first handheld device, for sharing the vehicular information in response to the request.

3. The system of claim 1, wherein the lightning device comprises at least one of a light emitting diode (LED) light or a condensed fluorescent light (CFL), and the lightning device blinks in a predefined pattern, when triggered by the controller.

4. The system of claim 1, wherein the first handheld device and the second handheld device operate on a Police Enforcement and Civilian Encounters (PEACE) device application.

5. The system of claim 4, wherein the Police Enforcement and Civilian Encounters (PEACE) device application provides information of passengers sitting in the vehicle and information of authorized driver of the vehicle.

6. The system of claim 4, wherein the first user and the second user are configured to sign into the PEACE device application on the first handheld device and the second handheld device respectively.

7. The system of claim 1, wherein the first handheld device is associated with a law enforcement officer and the second handheld device is associated with an owner, an authorized driver, and occupants of the vehicle.

8. The system of claim 7, wherein the PEACE device application facilitates at least three different roles for the first user and the second user, including the law enforcement officer, the owner of the vehicle, and the authorized driver of the vehicle.

9. The system of claim 8, wherein the PEACE device application provides a platform for the owner to add or remove all interested parties including one or more authorized drivers and one or more occupants.

10. The system of claim 7, wherein the first handheld device is configured to transmit a traffic stop notification to at least one of, the owner, the authorized driver, and the occupants of the vehicle, to actively respond by accepting and/or rejecting request to exchange information.

11. The system of claim 1, wherein the first handheld device is connected to a network for authentication of vehicular information with information stored in law enforcement central databases.

12. The system of claim 1, wherein the first handheld device shares information with a predefined law enforcement or police station, based on credentials of the first user.

13. The system of claim 1, wherein the first handheld device, the second handheld device, and the vehicular informatory device communicate using at least one of a Radio-Frequency identification (RFID), cellular network, Wi-Fi, Bluetooth, or Zigbee.

14. A method for authenticating vehicular and automobilist information of a vehicle, the method comprising:
generating a traffic stop notification, by a first handheld device associated with a first user, to access vehicular information of the vehicle of a second user;
transmitting, by a second handheld device associated with the second user, an acknowledgement signal upon receiving the traffic stop notification, to a vehicular informatory device mounted on the vehicle, wherein the vehicular informatory device comprises
a magnetic body coupled at a first side of the vehicular informatory device;
a plastic body coupled to the magnetic body, at a second side of the vehicular informatory device; and
a circuitry housed in the plastic body, wherein the circuitry facilitates communication among the first handheld device, the second handheld device, and the vehicular informatory device, for authenticating the vehicular information and automobilist of the vehicle, wherein the circuitry comprises a transceiver housed in the plastic body; and a controller coupled to the transceiver and configured to trigger a lightning device upon receiving the acknowledgement signal;

responding to the acknowledgement signal, by the second handheld device associated with the second user by accepting and/or rejecting the traffic stop notification; and exchanging the vehicular information of the second user and badge information of the first user between the first handheld device and the second handheld device, in response to the request.

15. The method of claim 14, wherein the first user manually generates the traffic stop notification when the second user is in proximity of the first user, to access the vehicular information of the vehicle of the second user and requests the second handheld device associated with the second user to respond to the traffic stop notification.

16. The method of claim 14, wherein the request is generated by an application installed on the first handheld device and the request is accepted by an application installed on the second handheld device.

17. A vehicular informatory device for authenticating vehicular and automobilist information of a vehicle, the vehicular informatory device comprising:

a magnetic body coupled at a first side of the vehicular informatory device to mount the vehicular informatory device on the vehicle;

a plastic body coupled to the magnetic body, at a second side of the vehicular informatory device; and a circuitry housed in the plastic body, wherein the circuitry comprises:

a transceiver housed in the plastic body, the transceiver configured to:
  receive an acknowledgement signal from a second handheld device upon accepting the request for sharing vehicular information by a second user, wherein the request is generated by a first user associated with a first handheld device; and
  transmit a signal, to the first handheld device, for sharing the vehicular information in response to the request; and a controller coupled to the transceiver, the controller configured to trigger a lightning device upon receiving the acknowledgement signal by the transceiver, wherein the vehicular informatory device is mounted on the vehicle and configured to communicate with the first handheld device and the second handheld device.

18. The vehicular informatory device of claim 17, wherein the circuitry corresponds to wireless circuitry and is coupled to a Lithium-ion or solar powered battery.

19. The vehicular informatory device of claim 17, wherein the lightning device comprises at least one of a light emitting diode (LED) light or a condensed fluorescent light (CFL).

20. The vehicular informatory device of claim 17, wherein the lightning device blinks in a predefined pattern, when triggered by the controller.

* * * * *